United States Patent

(12) United States Patent
Stiff et al.

(10) Patent No.: US 8,024,248 B2
(45) Date of Patent: Sep. 20, 2011

(54) SYSTEM AND METHOD FOR IMBEDDING A DEFINED BENEFIT IN A DEFINED CONTRIBUTION PLAN

(75) Inventors: Geoffrey Stiff, Richmond, VA (US); Matthew Sharpe, Richmond, VA (US); Landis William Atkinson, III, Richmond, VA (US)

(73) Assignee: Genworth Financial, Inc., Richmond, VA (US)

( * ) Notice: Subject to any disclaimer, the term of this patent is extended or adjusted under 35 U.S.C. 154(b) by 729 days.

(21) Appl. No.: 11/239,485

(22) Filed: Sep. 30, 2005

(65) Prior Publication Data

US 2006/0085338 A1 Apr. 20, 2006

Related U.S. Application Data

(63) Continuation-in-part of application No. 10/083,250, filed on Feb. 27, 2002, which is a continuation-in-part of application No. 09/876,053, filed on Jun. 8, 2001, now Pat. No. 7,398,241.

(60) Provisional application No. 60/614,589, filed on Oct. 1, 2004.

(51) Int. Cl.
*G06Q 40/00* (2006.01)

(52) U.S. Cl. ....................................... 705/36 R; 705/35

(58) Field of Classification Search ................ 705/36 R, 705/35, 4, 36 T, 38, 39, 40, 26, 30, 2, 37
See application file for complete search history.

(56) References Cited

U.S. PATENT DOCUMENTS

| | | | |
|---|---|---|---|
| 4,055,757 | A | 10/1977 | Tillman et al. |
| 4,742,457 | A | 5/1988 | Leon et al. |
| 4,750,121 | A | 6/1988 | Halley |
| 4,876,648 | A | 10/1989 | Lloyd |
| 4,969,094 | A | 11/1990 | Halley et al. |
| 4,975,840 | A | 12/1990 | DeTore et al. |
| 5,291,398 | A | 3/1994 | Hagan |

(Continued)

FOREIGN PATENT DOCUMENTS

| | | |
|---|---|---|
| EP | 0621556 | 10/1994 |

(Continued)

OTHER PUBLICATIONS

Griffin, Mark E "The federal income taxation of annuities: A success story" May 1995 Journal of the American Society of CLU & ChFC v49n3 pp. 44-56.*

(Continued)

*Primary Examiner* — Kelly Campen
(74) *Attorney, Agent, or Firm* — Hunton & Williams

(57) ABSTRACT

A system and method for providing a user with a portable benefit based on a formula the result of which indicates the exact guaranteed minimum periodic income that the user will receive no matter how long the user lives and the potential for an increase in the periodic income. The system comprises a defined contribution module for periodically receiving at least one of a sponsor contribution and a participant contribution and for accumulating value over a period of time by investing at least one of the sponsor contribution and the participant contribution or any portion(s) thereof in any number of select investment options, the accumulated value being capable of being withdrawn at any time and reinvested in any other select investment options being paid out after a predetermined period of time The guaranteed minimum income payment may be based on a retirement income formula.

12 Claims, 16 Drawing Sheets

U.S. PATENT DOCUMENTS 5,523,942 A 6/1996 Tyler et al.
5,631,828 A 5/1997 Hagan
5,655,085 A 8/1997 Ryan et al.
5,673,402 A 9/1997 Ryan et al.
5,689,649 A 11/1997 Altman
5,689,650 A 11/1997 McClelland et al.
5,696,907 A 12/1997 Tom
5,732,397 A 3/1998 DeTore et al.
5,745,706 A 4/1998 Wolfberg et al.
5,752,236 A 5/1998 Sexton
5,806,047 A 9/1998 Hackel et al.
5,819,230 A 10/1998 Christie et al.
5,864,685 A 1/1999 Hagan
5,878,405 A 3/1999 Grant et al.
5,893,071 A 4/1999 Cooperstein
5,907,828 A 5/1999 Meyer et al.
5,911,135 A 6/1999 Atkins
5,913,198 A * 6/1999 Banks ......................... 705/36 R
5,926,792 A 7/1999 Koppes et al.
5,930,760 A 7/1999 Anderton et al.
5,933,815 A 8/1999 Golden
5,946,668 A 8/1999 George
5,966,700 A 10/1999 Gould et al.
5,987,434 A 11/1999 Libman
5,995,947 A 11/1999 Fraser et al.
5,999,917 A 12/1999 Facciani et al.
6,012,043 A 1/2000 Albright et al.
6,014,632 A 1/2000 Gamble et al.
6,021,397 A 2/2000 Jones et al.
6,049,772 A 4/2000 Payne et al.
6,052,673 A 4/2000 Leon et al.
6,058,376 A 5/2000 Crockett
6,064,969 A 5/2000 Haskins
6,064,983 A 5/2000 Koehler
6,064,986 A 5/2000 Edelman
6,071,672 A 6/2000 Namba et al.
6,071,673 A 6/2000 Iguchi et al.
6,085,174 A 7/2000 Edelman
6,235,176 B1 5/2001 Schoen et al.
6,275,807 B1 8/2001 Schirripa
6,282,520 B1 8/2001 Schirripa
6,304,859 B1 10/2001 Ryan et al.
6,343,272 B1 1/2002 Payne et al.
6,473,737 B2 10/2002 Burke
6,584,446 B1 6/2003 Buchanan et al.
6,592,030 B1 7/2003 Hardesty
6,609,111 B1 8/2003 Bell
6,611,807 B1 8/2003 Bernheim et al.
6,611,808 B1 8/2003 Preti et al
6,611,815 B1 8/2003 Lewis et al.
6,615,180 B1 9/2003 Anderton et al.
6,625,582 B2 9/2003 Richman et al.
6,636,834 B1 10/2003 Schirripa
6,666,768 B1 * 12/2003 Akers ............................ 705/16
6,671,677 B2 12/2003 May
6,684,190 B1 1/2004 Powers et al.
6,947,904 B1 9/2005 Macey
6,950,805 B2 9/2005 Kavanaugh
6,963,852 B2 11/2005 Koresko
6,999,935 B2 2/2006 Parankirinathan
7,016,871 B1 3/2006 Fisher et al.
7,039,593 B2 5/2006 Sager
7,080,032 B2 7/2006 Abbs et al.
7,089,201 B1 8/2006 Dellinger et al.
7,113,913 B1 9/2006 Davis et al.
7,120,601 B2 10/2006 Chen et al.
7,143,051 B1 11/2006 Hanby et al.
7,149,712 B2 12/2006 Lang
7,249,030 B2 7/2007 Sopko, III et al.
7,249,037 B2 7/2007 Koppes et al.
7,249,077 B2 7/2007 Williams et al.
7,251,623 B1 7/2007 Ryan et al.
7,328,183 B1 2/2008 Leisle
7,376,608 B1 5/2008 Dellinger
7,392,202 B1 6/2008 O'Brien
7,398,241 B2 7/2008 Fay et al.
7,590,583 B1 9/2009 Ferguson et al.
7,613,644 B1 11/2009 Abbs et al.
7,640,202 B2 12/2009 Foti et al.
7,653,560 B2 1/2010 Hueler
7,676,414 B1 3/2010 Abbs et al.
7,685,007 B1 3/2010 Jacobson
7,685,065 B2 3/2010 Weiss et al.
7,689,644 B2 3/2010 Teruyuki et al.
7,698,158 B1 4/2010 Flagg
7,716,075 B1 5/2010 Payne
7,769,664 B2 8/2010 Egan
7,778,907 B1 8/2010 Haskins et al.
7,778,908 B1 8/2010 Grumet
7,797,174 B2 9/2010 Samuels
7,801,792 B2 9/2010 Tatro et al.
7,813,985 B2 10/2010 O'Flinn et al.
7,840,470 B2 11/2010 Robinson
7,840,471 B2 11/2010 Foti et al.
7,853,460 B2 12/2010 Ruark
7,877,306 B2 1/2011 Michalowski et al.
7,877,307 B2 1/2011 Tatro et al.
7,885,832 B2 2/2011 Collins et al.
7,885,834 B2 2/2011 Weiss
7,885,837 B1 2/2011 Martin
7,890,402 B2 2/2011 Golembiewski
2001/0014873 A1 8/2001 Henderson et al.
2001/0037276 A1 11/2001 Kelly et al.
2001/0049612 A1 12/2001 Davis
2002/0035527 A1 3/2002 Corrin
2002/0052764 A1 * 5/2002 Banks ............................... 705/4
2002/0052784 A1 5/2002 Sherwin et al.
2002/0052818 A1 5/2002 Loveland
2002/0069090 A1 6/2002 De Grosz et al.
2002/0077866 A1 6/2002 Javerlhac
2002/0077868 A1 6/2002 Javerlhac
2002/0087365 A1 7/2002 Kavanaugh
2002/0091539 A1 7/2002 Yin et al.
2002/0103678 A1 8/2002 Burkhalter et al.
2002/0103679 A1 8/2002 Burkhalter et al.
2002/0103733 A1 8/2002 Barrington et al.
2002/0116311 A1 8/2002 Chalke et al.
2002/0138386 A1 9/2002 Maggioncalda et al.
2002/0165740 A1 11/2002 Saunders
2002/0169715 A1 11/2002 Ruth et al.
2002/0184129 A1 12/2002 Arena et al.
2002/0188540 A1 12/2002 Fay et al.
2002/0194098 A1 12/2002 Stiff et al.
2002/0198802 A1 12/2002 Koresko
2002/0198827 A1 12/2002 van Leeuwen
2003/0004844 A1 1/2003 Hueler
2003/0014285 A1 1/2003 Richard
2003/0018498 A1 * 1/2003 Banks ............................... 705/4
2003/0033172 A1 2/2003 Menke
2003/0065539 A1 4/2003 Kay
2003/0088430 A1 5/2003 Ruark
2003/0088512 A1 5/2003 Hoter-Ishay
2003/0093303 A1 5/2003 Pooler
2003/0125982 A1 7/2003 Ginsberg
2003/0135396 A1 7/2003 Javerlhac
2003/0167220 A1 9/2003 Schoen et al.
2003/0172018 A1 9/2003 Chen et al.
2003/0187764 A1 10/2003 Abbs et al.
2003/0191672 A1 10/2003 Kendall et al.
2003/0195827 A1 10/2003 Lichtig
2003/0233301 A1 12/2003 Chen et al.
2004/0078244 A1 4/2004 Katcher
2004/0088201 A1 5/2004 Lang
2004/0088236 A1 5/2004 Manning
2004/0093242 A1 5/2004 Cadigan et al.
2004/0107134 A1 6/2004 Nelson
2004/0111045 A1 6/2004 Sullivan et al.
2004/0117286 A1 6/2004 Charnley, Jr.
2004/0158517 A1 8/2004 Mahaney et al.
2004/0172350 A1 9/2004 Atkinson et al.
2004/0177022 A1 9/2004 Williams et al.
2004/0181436 A1 9/2004 Lange
2004/0199446 A1 10/2004 Lange
2004/0225536 A1 11/2004 Schoen et al.
2004/0249660 A1 12/2004 Williams et al.
2004/0267647 A1 12/2004 Brisbois
2005/0010453 A1 1/2005 Terlizzi et al.

| | | | |
|---|---|---|---|
| 2005/0015282 | A1 | 1/2005 | Gutman et al. |
| 2005/0033611 | A1 | 2/2005 | Phelps |
| 2005/0033612 | A1 | 2/2005 | Donovan et al. |
| 2005/0038681 | A1 | 2/2005 | Covert |
| 2005/0038682 | A1 | 2/2005 | Gandee et al. |
| 2005/0060251 | A1 | 3/2005 | Schwartz et al. |
| 2005/0071205 | A1 | 3/2005 | Terlizzi et al. |
| 2005/0080739 | A1 | 4/2005 | Sherzan et al. |
| 2005/0080741 | A1 | 4/2005 | Sherzan |
| 2005/0144124 | A1 | 6/2005 | Stiff et al. |
| 2005/0149425 | A1 | 7/2005 | Hagan |
| 2005/0154658 | A1 | 7/2005 | Bove et al. |
| 2005/0177509 | A1 | 8/2005 | Mahaney et al. |
| 2005/0187840 | A1 | 8/2005 | Stiff et al. |
| 2005/0187869 | A1 | 8/2005 | Buerger |
| 2005/0216316 | A1 | 9/2005 | Brisbois et al. |
| 2005/0234747 | A1 | 10/2005 | Kavanaugh |
| 2005/0234821 | A1 | 10/2005 | Benham et al. |
| 2006/0026036 | A1 | 2/2006 | Mahmood |
| 2006/0041453 | A1 | 2/2006 | Clark et al. |
| 2006/0041455 | A1 | 2/2006 | Dehais |
| 2006/0059020 | A1 | 3/2006 | Davidson |
| 2006/0080191 | A1 | 4/2006 | Hinson |
| 2006/0085313 | A1 | 4/2006 | Selby |
| 2006/0085338 | A1 | 4/2006 | Stiff |
| 2006/0143055 | A1 | 6/2006 | Loy et al. |
| 2006/0146951 | A1 | 7/2006 | Chiu |
| 2006/0149651 | A1 | 7/2006 | Robinson |
| 2006/0155631 | A1 | 7/2006 | Kondaks |
| 2006/0161461 | A1 | 7/2006 | Trani et al. |
| 2006/0206417 | A1 | 9/2006 | Selby |
| 2006/0212380 | A1 | 9/2006 | Williams et al. |
| 2006/0242052 | A1 | 10/2006 | Long et al. |
| 2006/0271411 | A1 | 11/2006 | Gregg et al. |
| 2007/0011089 | A1 | 1/2007 | DeSchryver |
| 2007/0021986 | A1 | 1/2007 | Cheung et al. |
| 2007/0033124 | A1 | 2/2007 | Herr et al. |
| 2007/0038481 | A1 | 2/2007 | Darr |
| 2007/0038487 | A1 | 2/2007 | McCarthy |
| 2007/0050217 | A1 | 3/2007 | Holden, Jr. |
| 2007/0061238 | A1 | 3/2007 | Merton et al. |
| 2007/0078690 | A1 | 4/2007 | Kohl |
| 2007/0094053 | A1 | 4/2007 | Samuels |
| 2007/0094054 | A1 | 4/2007 | Crabb |
| 2007/0094125 | A1 | 4/2007 | Izyayev |
| 2007/0094127 | A1 | 4/2007 | Izyayev |
| 2007/0100720 | A1 | 5/2007 | Bonvouloir |
| 2007/0100726 | A1 | 5/2007 | O'Flinn et al. |
| 2007/0143199 | A1 | 6/2007 | Stiff et al. |
| 2007/0136164 | A1 | 7/2007 | Roti et al. |
| 2007/0162365 | A1 | 7/2007 | Weinreb |
| 2007/0168235 | A1 | 7/2007 | Livingston et al. |
| 2007/0185741 | A1 | 9/2007 | Hebron et al. |
| 2007/0214022 | A1 | 9/2007 | Hagelman, Jr. et al. |
| 2007/0214071 | A1 | 9/2007 | Stone |
| 2007/0250427 | A1 | 10/2007 | Robinson |
| 2008/0010095 | A1 | 1/2008 | Joyce |
| 2008/0021744 | A1 | 1/2008 | Walker et al. |
| 2008/0027762 | A1 | 1/2008 | Herzfeld et al. |
| 2008/0071661 | A1 | 3/2008 | Jeudy et al. |
| 2008/0077450 | A1 | 3/2008 | Klippel |
| 2008/0082371 | A1 | 4/2008 | Phillips |
| 2008/0103839 | A1 | 5/2008 | O'Brien |
| 2008/0109341 | A1 | 5/2008 | Stiff |
| 2008/0133280 | A1 | 6/2008 | Ziegler |
| 2008/0215376 | A1 | 9/2008 | Engelman |
| 2008/0270194 | A1 | 10/2008 | West et al. |
| 2008/0270195 | A1 | 10/2008 | Gottlieb |
| 2008/0281761 | A1 | 11/2008 | Egan |
| 2008/0288297 | A1 | 11/2008 | Koo |
| 2009/0030735 | A1 | 1/2009 | Tatro et al. |
| 2009/0030736 | A1 | 1/2009 | Tatro et al. |
| 2009/0030737 | A1 | 1/2009 | Weiss |
| 2009/0030738 | A1 | 1/2009 | Golembiewski |
| 2009/0030739 | A1 | 1/2009 | Tatro et al. |
| 2009/0030740 | A1 | 1/2009 | Robinson |
| 2009/0037231 | A1 | 2/2009 | Menke |
| 2009/0063203 | A1 | 3/2009 | Baiye |
| 2009/0089104 | A1 | 4/2009 | Kondaks |
| 2009/0094069 | A1 | 4/2009 | Castille et al. |
| 2009/0094070 | A1 | 4/2009 | Harris et al. |
| 2009/0099979 | A1 | 4/2009 | Raghavan et al. |
| 2009/0132300 | A1 | 5/2009 | Weiss et al. |
| 2009/0132430 | A1 | 5/2009 | Weiss |
| 2009/0171831 | A1 | 7/2009 | Johnson et al. |
| 2009/0192829 | A1 | 7/2009 | Long et al. |
| 2009/0192830 | A1 | 7/2009 | Shemtob |
| 2009/0271222 | A1 | 10/2009 | Marks et al. |
| 2009/0307016 | A1 | 12/2009 | Gray et al. |
| 2009/0319303 | A1 | 12/2009 | Harkensee et al. |
| 2010/0030583 | A1 | 2/2010 | Fievoli et al. |
| 2010/0030584 | A1 | 2/2010 | Guilbert et al. |
| 2010/0070310 | A1 | 3/2010 | Ferguson et al. |
| 2010/0076792 | A1 | 3/2010 | Mule et al. |
| 2010/0088114 | A1 | 4/2010 | Carstens |
| 2010/0106532 | A1 | 4/2010 | Brown et al. |
| 2010/0121659 | A1 | 5/2010 | Hueler |
| 2010/0125465 | A1 | 5/2010 | Hueler |
| 2010/0138245 | A1 | 6/2010 | Baiye |
| 2010/0145735 | A1 | 6/2010 | Kendall et al. |
| 2010/0169128 | A1 | 7/2010 | Berlin et al. |
| 2010/0169129 | A1 | 7/2010 | Kavanaugh |
| 2010/0174565 | A1 | 7/2010 | Weiss et al. |
| 2010/0185468 | A1 | 7/2010 | Methot |
| 2010/0256995 | A1 | 10/2010 | Oliver |
| 2010/0299160 | A1 | 11/2010 | Roscoe et al. |
| 2011/0035239 | A1 | 2/2011 | Scheinerman et al. |
| 2011/0066453 | A1 | 3/2011 | Tatro et al. |

FOREIGN PATENT DOCUMENTS

| | | |
|---|---|---|
| WO | 9822936 | 5/1998 |
| WO | WO 00/13118 | 3/2000 |
| WO | WO 00/14664 | 3/2000 |
| WO | 0120512 | 3/2001 |
| WO | 0188834 | 11/2001 |
| WO | WO 02/067096 | 8/2002 |
| WO | 04099943 | 11/2004 |
| WO | 2009/074878 | 6/2009 |

OTHER PUBLICATIONS

Anonymous "The White House: Remarks by the President in Social Security Forum Town Hall meeting—Part 1 of 3" Jul. 28, 1998M2 Presswire , p N/A.*

"New Variable Annuity Features Provide Value, but at a Cost", Located at http://www.insure.com/life/annuity/newerfeatures.html.

"Getting out of Your Annuity", by M. Cybulski, located at http://www.insure.com/life/annuity/basics.html.

"The Ups and Downs of Immediate Variable Annuities" by M. Cybulski. located at http://www.insure.com/life/annuity/getout.html.

"The Basics of Annuities", by M. Cybulski, located at http://www.insure.com/life/annuity/immediate.html.

International Search Report dated May 4, 2004 for Application No. PCT/US03/05696.

Brown, et al., "Joint Life Annuities and Annuity Demand by Married Couples", Journal of Risk and Insurance, 67, 4, 527, Dec. 2000.

Financial Services Report, vol. 7, No. 10, May 9, 1990, Planco provides marketing services include colonial penn's popular annuity.

"Notification of Transmittal of the International Search Report or the Declaration" from International Application No. PCT/US02/16471 mailed Dec. 10, 2002.

New York Life Introduces Lifestages ® Elite Variable Annuity, New York Life, Oct. 1, 2003, 3 pages, http://www.newyorklife.com/cda/0,3254,12212,00.html.

New York Life Unveils Lifetime Income Product Featuring Liquidity, Inflation Protection, and Legacy Options, New York Life, 3 pages, http://www.newyorklife.com/cda/0,3254,12346,00.html.

Prudential Introduces Income Bridge Approach to Retirement Planning, Business Wire, Mar. 15, 2004, 1 pg.

Prudential Retirement Expands Patent-Pending Income Bridge Approach(R) to Help Maximize Social Security Benefits to Retail Clients: New Report Unveiled on Helping to Maximize Social Security Benefits, Business Wire, 2006 2 pgs.

Ibbotson Seeks Partnerships For Combined Fund, Annuity, Defined Contribution & Savings Plan Alert, Euromoney Institutional Investor PLC, Nov. 10, 2006, 1 pg.
Lincoln Financial Group Enhances Variable Annuity Option Lincoln SmartSecurity(SM) Advantage To Offers Guaranteed Lifetime Income for Both Investor and Spouse, PR Newswire Association LLC, Nov. 6, 2006, 3 pgs.
Lincoln Financial Group's i4LIFE® Advantage Reaches Milestone as Elections Cross $1.0 Billion in 2006 Sales; Straight Record-Breaking Quarter, PR Newswire Association LLC, Nov. 6, 2006, 3 pgs.
Prudential Responds to 'Retirement Revolution' with Innovative, Patent-Pending Guaranteed-Income Product, Business Wire, Dec. 13, 2006, 3 pgs.
Debaise, Insurers Add a Twist to Annuity Offerings, The Wall Street Journal. online (www.WSJ.com), Jan. 5, 2006, 4 pgs.
New York Life Brings Longevity Protection to Immediate Annuities: New Option Allows Clients to Customize retirement Payments According to Personal Needs and Life Events, Business Wire, Oct. 6, 2005, 2 pgs.
Lavine, New York Life Annuity Builds on Two Popular Features: Expects New Product to Attract $200 Million Within a Year, Annuity Market News, Thomson Media Inc. Feb. 1, 2005, 2 pgs.
American Express Financial Group Launches Annuities Feature Designed to Help Investors "Fight Off the Bears and Run With the Bulls", Business Wire, May 3, 2005, 2 pgs.
Golden Rule Insurance Company Receives Patent For Its Life/Long-Term Care Insurance Concept, PR Newswire, Jul. 15, 2003, 1 pg.
Hogan, 401(k) Provider Offers Guaranteed Income, www.ignites.com, Apr. 14, 2005, 2 pgs.
Tergesen, New Wrinkles For Annuities, BusinessWeek, Jul. 24, 2006, 4 pgs.
McEvoy, Replacing Insurance Policies Can Be Tricky, State Journal Register, Jan. 29, 1995, 2 pgs.
Fraser, Short Takes: Discover Brokerage Top 10 Stocks, American Broker, vol. 164 Issue 40 Mar. 1, 1999, 1 pg.
Smith et al., Annuity Tax and Planning Considerations, Journal of the American Society of CLU & ChFC, Bryn Mawr, vol. 46, Iss. 1, Jan 1992.
Andrews, Listen Carefully and Sell More Annuities, Life & Health Insurance Sales, Indianapolis, vol. 140, Iss. 6, Nov/Dec 1997.
Tregarthen, Double the Benefit with a Split Annuity, Life Association News, Washington, vol. 92, Iss. 9, Sep 1997.
Feldstein et al., Accumulated Pension Collars: A Market Approach to Reducing the Risk of Investment-Based Social Security Reform, National Bureau of Economic Research Working Paper 7861, Aug. 2000.
"TIAA-CREF Life Introduces Innovative Low-Cost Single Premium Immediate Annuity," Aug. 16, 2001.
Feldman, A. "Can This New 401(k) Save Retirement?," Business Week, Feb. 16, 2009.
www.annuityadvisors.com/FAQ/Equitylndexed.asp.
Derivatives R US—Structured Notes, 1995.
U.S. Appl. No. 09/595,898, filed Jun. 20, 2000.
"Which Types of Insurance Do You Actually Need?" www.thirdage.com, 2006.
Customer Action. Understanding Credit Card Costs. Dec. 27, 1996. pp. 1-8. As viewed on May 4, 2011 at http://www.consumer-action.org/english/articles/understanding_credit_card_costs_tips_on_reducing_finance.

* cited by examiner

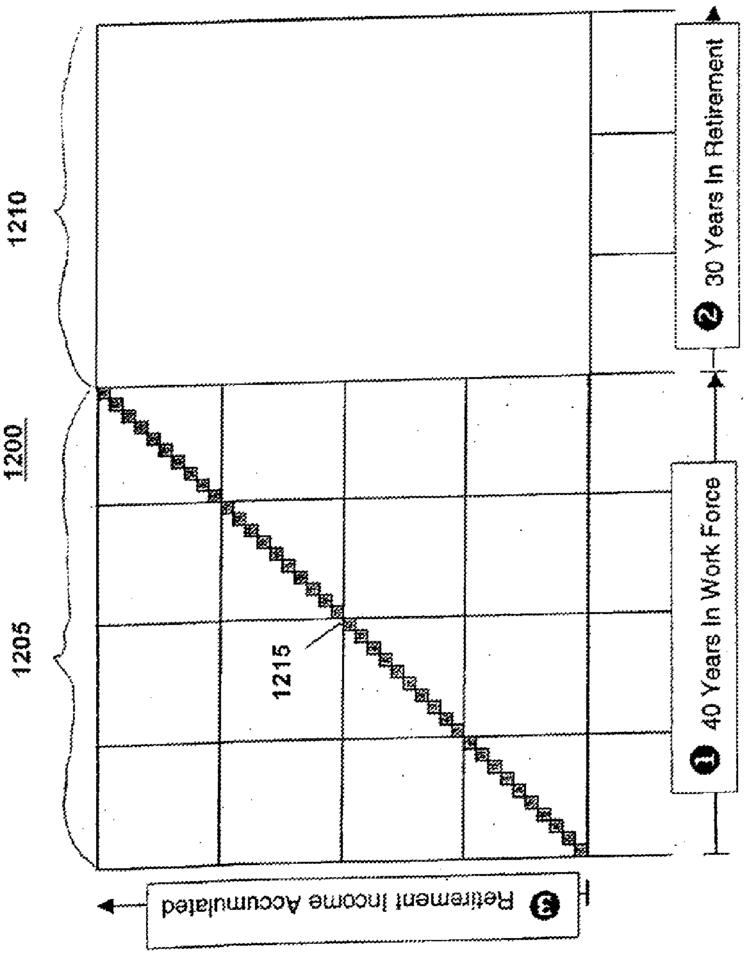

❶ To Save Adequately For Retirement, It Takes A Discipline Plan Of Putting Money Aside Over an Entire Working Life ❷ In General Retirement Savings Need To Last 30 Years For A Married Couple ❸ This Business Method Translates Each $ Saved Into A $ Of Guaranteed Minimum Retirement Income ❹ The Translation Takes The Form Of A Retirement Income Factor. The Factor Times The Amount Saved Is The Guaranteed Minimum Retirement Income ❺ The Retirement Income Factor Varies By Age, Gender, Retirement Date, When Periodic Savings Began, Type Of Payout Plan Selected, Single or Joint life, Product Features and Expenses, and Economic Cycle

Annual Retirement Income

Accrued Retirement Income

| Year Layer Established For Election Year | Current Account Balance Of Allocations | Total Transfers Made To Income | X | Minimum Retirement Income Guarantee % | = | Accrued Minimum Retirement Income @65 | Upside Retirement Income @65 If Account Balance Grows At 8% |
|---|---|---|---|---|---|---|---|
| 1999 ❶ | $35,751.58 ❺ | $25,000.00 ❷ | | 15.1234% ❸ | | $3,781 ❹ | $4,750 ❻ |

❶ In This Case The Employee Initially Started Saving For Retirement In 1999

❷ The Employee Has Saved $25,000 Since 1999

❸ The Retirement Income Factor Was Quoted And Guaranteed Back In 1999. As Long As The Employee Keeps Saving According To The 1999 Savings Plan, The Factor Will Stay Constant ❹ The Guaranteed Minimum Income Is The Amount Saved Times The Factor ❺ The Savings Are Invested In A Pension Type Balanced Portfolio, Have A Current Account Value, Are Expected To Grow Over Time, And Can Be Transferred/Liquidated Out Of The Defined Benefit Account And Into The Normally Available Investment Options ❻ The Performance Of The Pension Type Balanced Portfolio Might Be Sufficient Enough To Add to The Guaranteed Minimum Income

Annual Retirement Income

Accrued Retirement Income

| Year Layer Established For Election Year | Current Account Balance Of Allocations | Total Transfers Made To Income | X | Minimum Retirement Income Guarantee % | = | Accrued Minimum Retirement Income @65 | Upside Retirement Income @65 If Account Balance Grows At 8% |
|---|---|---|---|---|---|---|---|
| 1999 | $35,751.58 | $25,000.00 | | 15.1234% | | $3,781 | $4,750 |
| 2001 ❶ | $4,897.55 ❺ | $4,000.00 ❷ | | 14.5670% ❸ | | 583 ❹ | 783 ❻ |
| Total ❼ | $40,649.13 | $29,000.00 | | | | $4,364 | $5,533 |

❶ In This Case The Employee Has Decided To Add Another Layer Of Retirement Income, And This Layer Was Initially Started In 2001

❷ The Employee Has Saved $4,000 Since 2001 For This Layer

❸ The Retirement Income Factor For This Layer Was Quoted And Guaranteed Back In 2001. As Long As The Employee Keeps Saving According To The 2001 Savings Plan Layer, The Factor Will Stay Constant ❹ The Guaranteed Minimum Income Is The Amount Saved For This Layer Times The Factor For This Layer ❺ The Savings Are Invested In A Pension Type Balanced Portfolio, Have A Current Account Value, Are Expected To Grow Over Time, And Can Be Transferred/Liquidated Out Of The Defined Benefit Account And Into The Normally Available Investment Options ❻ The Performance Of The Pension Type Balanced Portfolio Might Be Sufficient Enough To Add to The Guaranteed Minimum Income ❼ The Accrued Retirement Income Picture Is the Sum Of Both Layers And Totally Vested If Allowed By The 401 (k) Plan

Annual Retirement Income

Accrued Retirement Income

| Year Layer Established For Election Year | Current Account Balance Of Allocations | Total Transfers Made To Income | X | Minimum Retirement Income Guarantee % | = | Accrued Minimum Retirement Income @65 | Upside Retirement Income @65 If Account Balance Grows At 8% |
|---|---|---|---|---|---|---|---|
| 1999 | $35,751.58 | $25,000.00 | | 15.1234% | | $3,781 | $4,750 |
| 2001 | $4,897.55 | $4,000.00 | | 14.5670% | | 583 | 783 |
| Total | $40,649.13 | $29,000.00 | | | | $4,364 | $5,533 |

Potential Retirement Income On Future Transfers To Income

| Layer Established For Election Year ❶ | Future Projected Annual Transfers ❷ | X | Minimum Retirement Income Guarantee % ❸ | X | Years Until You Turn [65] ❹ | = | Potential Minimum Annual Income From Future Transfers To Income @65 ❺ | Upside Retirement Income @[65] If Future Transfers Grow At 8% ❻ |
|---|---|---|---|---|---|---|---|---|
| 1999 | $5,000.00 | | 15.1234% | | 15.5 | | $ 11,721 | $ 13,620 |
| 2001 | $2,000.00 | | 14.5670% | | 15.5 | | $ 4,516 | $ 5,143 |
| Total | $7,500.00 | | | | | | $ 16,236 | $ 18,763 |
| Total Of Accrued and Potential Retirement Income ❼ | | | | | | | $ 20,000 | $ 24,296 |

❶ The Projection Of Benefits Is Based On Layers Already Established

❷ For Each layer There Is An Is An Expected Future Annual Transfers To The Defined Benefit Account ❸ The Same Retirement Income Factors Continue For Each Layer As Previously Established And Quoted ❹ For A Projection Of Benefits There Is A Projection Of The Number Of Future Years That Transfers Will Be Made Before Retirement Begins ❺ The Projected Guaranteed Minimum Income Is The Annual Savings Amount For Each Layer Times The Factor For The Layer Times The Number Of Years Expected To Contribute To Retirement Income ❻ The Performance Of The Pension Type Balanced Portfolio Might Be Sufficient Enough To Add to The Guaranteed Minimum Income ❼ The Total Retirement Income Picture Is the Sum Of Both Layers Accrued And Projected

Figure 15

SYSTEM AND METHOD FOR IMBEDDING A DEFINED BENEFIT IN A DEFINED CONTRIBUTION PLAN

RELATED APPLICATION

This application claims the benefit of U.S. Provisional Application No. 60/614,589, filed Oct. 1, 2004. This patent application is also a continuation-in-part of U.S. patent application Ser. No. 10/083,250, filed Feb. 27, 2002, which is a continuation-in-part of U.S. patent application Ser. No. 09/876,053, filed Jun. 8, 2001. The specifications and drawings of each of the above applications are expressly incorporated herein by reference.

BACKGROUND OF THE INVENTION

The present invention relates generally to a system and method for providing a user with a plurality of guaranteed minimum retirement income payments and, more particularly, to a system and method for guaranteeing minimum periodic retirement income payments using a defined benefit account inside of a defined contribution plan.

Up until about 1870, more than half of the United States' adult workers were farmers. These adult workers were typically engaged in their occupations until their death or until their health prevented them from continuing their occupations. It was uncommon to have a prolonged retirement period before a worker's death.

After 1870, however, industry developed rapidly and the economy tended increasingly to be characterized by industrialization and urbanization. The result was that workers increasingly were employed in more industry-related jobs and became more dependent upon a continuing flow of monetary income to provide for themselves and their families. Additionally, the average life expectancies of workers began to increase significantly. It became more common for workers to retire from employment and to survive for longer periods of time following their retirements. Retirement programs began to take hold. The Social Security program was introduced in 1935 and had an old age insurance component which provided a lump sum benefit for workers at age 65. At that time, the average life expectancy of a worker was 68.

Currently, however, half of male workers reaching age 65 can expect to still be alive at age 82 and half of female workers reaching age 65 can expect to be alive at age 86. The Social Security program is not keeping pace with such changes. The number of employees entering the workforce has been less than the number of new retirees for the last several years and this trend is expected to increase as the "Baby Boomers" age. The Social Security Administration ("SSA") projects a shortfall in its trust fund which provides benefits to retirees beginning in 2013. The SSA believes that an immediate and permanent increase of social security payroll taxes is necessary in order to enable it to pay for the full amount of old age benefits it currently provides retirees. Now, employees and employers contribute approximately 12.4 percent of salaries to the Social Security trust fund. The SSA projects that contributions must be increased to at least 38 percent in order for its trust fund to remain fully funded. Therefore, it is becoming increasingly uncertain whether the Social Security program will continue to remain viable until the time that today's workers are ready to retire. Moreover, many retirees have found that the amount of retirement benefits to which they are entitled under the Social Security program is insufficient to enable them to maintain a desired level of comfort in their retirement. They have found a need to supplement such Social Security benefits with income from other sources.

In addition to the institution of the Social Security program in the 1930s, beginning in the early 1900s, it became increasingly more common for employers to provide their workers, or employees, with some sort of retirement benefits or pensions. These retirement benefits or pensions were originally designed, in part, to reward an employee for his/her long career with a company and to help provide an income once such employee retired. Such retirement benefits or pension plans therefore required minimum periods of employment before an employee's entitlement to the pension amount became vested. However, many such retirement benefits or pensions are not portable. In other words, if an employee leaves the employ of an employer, that employee may lose all entitlement to such retirement benefit or pension if the employee terminates his/her employment prior to the expiration of the vesting period. This was not a problem when employers first instituted such retirement benefits or pension plans as employees tended to remain employed with one employer for their entire career until they retired.

However, in today's mobile society, employees do not tend to remain employed by one employer for their entire careers. Many employees therefore lose some or all of their projected retirement benefits which may have accrued during their employ by their employers when they leave the employ of such employers.

Furthermore, in addition to the trend of a more mobile society and an increased level of employment changes, many employers are decreasing the numbers of their employees and are instead increasingly turning to non-employee labor in part to cut expenses resulting from employee benefits such as costs related to funding employee retirement plans. Thus, many individuals in the workforce today are technically not considered "employees" but instead are independent contractors for whom employment benefits such as retirement benefits are not provided. Additionally, many employers are ceasing to offer defined benefit plans altogether because of the costs. In fact, according to statistics published by the Pension Benefit Guaranty Corporation, defined benefit pension plans of employers have decreased by more than 60 percent since 1985, with the number of U.S.-based employers that offer such defined benefit pension plans decreasing from 114,000 in 1985 to less than 40,000 in 1999. Only 21.3 percent of working family heads are currently covered by an employer-funded defined retirement benefit or pension plan.

Because of the decrease in the number of employers that offer defined retirement benefit pension plans, the decrease in the number of workers entitled to employer-funded retirement benefits and also because of the increased mobility of the workforce resulting in the loss of such employer-funded benefits, many workers have started to fund their own retirement savings plans. Tax laws have enabled workers to realize tax benefits from deferring their income by putting amounts from their paychecks into such retirement savings plans. Increasingly, such employee-self-funded retirement savings plans are becoming the primary sources of income on which employees survive following retirement.

However, one disadvantage of the increased reliance upon employee-self-funded retirement savings is that these plans do not provide a level of retirement income that is guaranteed for the employee. In addition, many employees do not have any idea of an amount required to be saved in order to achieve a desired level of income to ensure a comfortable lifestyle upon their retirement. Thus, they do not contribute a sufficient amount of their salaries towards such retirement savings to provide an adequate income level to maintain the standard of living they desire upon retirement. Based on the results of the Retirement Confidence Survey sponsored by the Employee Benefits Research Institute (EBRI), the American Savings Education Council (ASEC), and Matthew Greenwald and Associates, 22 percent of all employed adult workers have saved less than $10,000 towards retirement, 50 percent have saved less than $50,000 and only 25 percent of adult workers over the age of 55 have accumulated more than $100,000.

Retirement income needs may increase in the event such retirees suffer from health-related problems. In fact, many employees today express concern that they will not have adequate funds saved to provide for themselves during their retirement in the event they suffer health-related problems after they retire. They are currently seeking some means to ensure a higher level of income saved for such crises.

Employees often do not participate in their employer-sponsored retirement savings plans which will increase the level of their savings through interest income or a return on investment. Also, many individuals lack the sophistication needed to determine the appropriate type of investment vehicle which will offer them a high return on their investment but which is also secure enough so that their savings are not placed at risk by a high-risk type of investment vehicle.

Thus, there is a need for an investment vehicle which will provide a future minimum retirement income and a current account value, both of which are portable so that a worker will not lose any value or income vested in a fully funded investment vehicle if the worker leaves the employ of an employer or changes jobs.

There is also a need to provide a defined retirement benefit which will guarantee an individual a minimum defined income level upon the individual's retirement.

Additionally, there is a need for a retirement investment vehicle which may provide a guaranteed minimum level of retirement income and also may afford an individual an opportunity for an increase in value of the benefits provided if market performance of the retirement vehicle exceeds a predefined benchmark.

Additionally, there is a need for an investment vehicle that addresses multiples of these concerns and may help workers accumulate additional wealth, and more tangibly plan for income generation during retirement.

BRIEF SUMMARY OF THE INVENTION

The above-described problems and needs are addressed by the system and method of the present invention.

According to one embodiment of the invention, a system is provided for providing a user with a defined benefit within a qualified or non-qualified defined contribution plan, based on a factor that indicates the exact guaranteed minimum periodic income that the user will receive no matter how long the user lives and the potential for an increase in the periodic income based on excess investment performance over the formula of the designated defined benefit investment options. The system comprises a defined contribution module for periodically receiving at least one of a sponsor contribution and a participant contribution and for accumulating value over a period of time by investing at least one of the sponsor contribution and the participant contribution or any portion(s) thereof in any number of select investment option(s), the accumulated value, or any portion(s) thereof, being capable of: (1) being withdrawn at any time, or (2) being paid out after a predetermined period of time; and wherein the selected investment options comprise any number of investment products and at least one designated defined benefit investment option module for: (1) receiving at least one investment payment from the defined contribution module, the investment payment comprising at least one of the sponsor contribution, the participant contribution, and/or the accumulated value, or any portion(s) thereof, (2) for paying out a guaranteed minimum income payment after the accumulation period of time, the guaranteed minimum income payment being based on a retirement income factor, and (3) increasing the income payment for life for excess performance over the factor of the designated defined benefit investment option.

In another embodiment of the invention, a method for guaranteeing a minimum income payment is provided. The method comprises receiving at least one contribution from at least one of a sponsor and participant; and investing the at least one contribution, or any portion thereof, into any number of investment options selected by the participant, the selected investment options comprising at least one defined benefit account that accumulates value and guarantees the participant a guaranteed minimum income payment which may be paid out any time after a predetermined period of time and which is capable of, in whole or in part, being withdrawn or reinvested into any number of the investment options any time prior to pay out, the guaranteed minimum income payment based on at least a retirement income factor.

In another embodiment of the invention, a system for providing a user with a defined benefit, within a qualified or non-qualified defined contribution plan, is provided. The system comprises a savings module for receiving at least one investment payment, the investment payment comprising at least one of a sponsor contribution or a user contribution; a benefit component which provides a minimum income guarantee to be available at a future date where the minimum income guarantee is derived from a formula; and an accumulation component for delivering to the user the market performance of an investment vehicle during an accumulation phase, and for providing the potential for increases in future income above the minimum income guarantee based on market performance of the investment vehicle both during an accumulation and a payout phase.

In another embodiment of the invention, a method for providing a user with a defined benefit, within a qualified or non-qualified defined contribution plan, is provided. The method comprises receiving, via a savings module, at least one investment payment, the investment payment comprising at least one of a sponsor contribution or a user contribution; providing, via a benefit component, a minimum income guarantee to be available at a future date where the minimum income guarantee is derived from a formula; and delivering to the user, via an accumulation component, the market performance of an investment vehicle during an accumulation phase, and for providing the potential for increases in future income above the minimum income guarantee based on market performance of the investment vehicle both during an accumulation and a payout phase.

In another embodiment of the invention, a system and method for tracking and illustrating the guarantee income by participant is provided. In some embodiments, tracking is accomplished by a system/database that runs on top of the plan administration system (e.g., 401(k) plan administration system). In some embodiments, tracking may be done by a shadow database of and which is not a duplication of the administrative system of the defined contribution plan, where the shadow database and the administration system may be operated by the same or different parties. The administration system may provide information such as the contributions, withdrawals, and account balance(s). The tracking system may then use this information to perform calculations of the income guarantee and corresponding illustration and statement work.

The accompanying drawings, which are incorporated in and constitute a part of this specification, together with the description, serve to explain the principles of the invention.

BRIEF DESCRIPTION OF THE DRAWINGS

FIG. 12 illustrates one embodiment of a chart illustrating the accumulation of value throughout the accumulation phase and the retirement phase.

FIG. 13 illustrates one embodiment of an interface showing accrued retirement income from a defined benefit account.

FIG. 14 illustrates one embodiment of an interface showing two buyers of accrued retirement income from two defined benefit accounts.

FIG. 15 illustrates one embodiment of an interface showing a projection of benefit accounts.

DETAILED DESCRIPTION OF THE INVENTION

Figure 1:
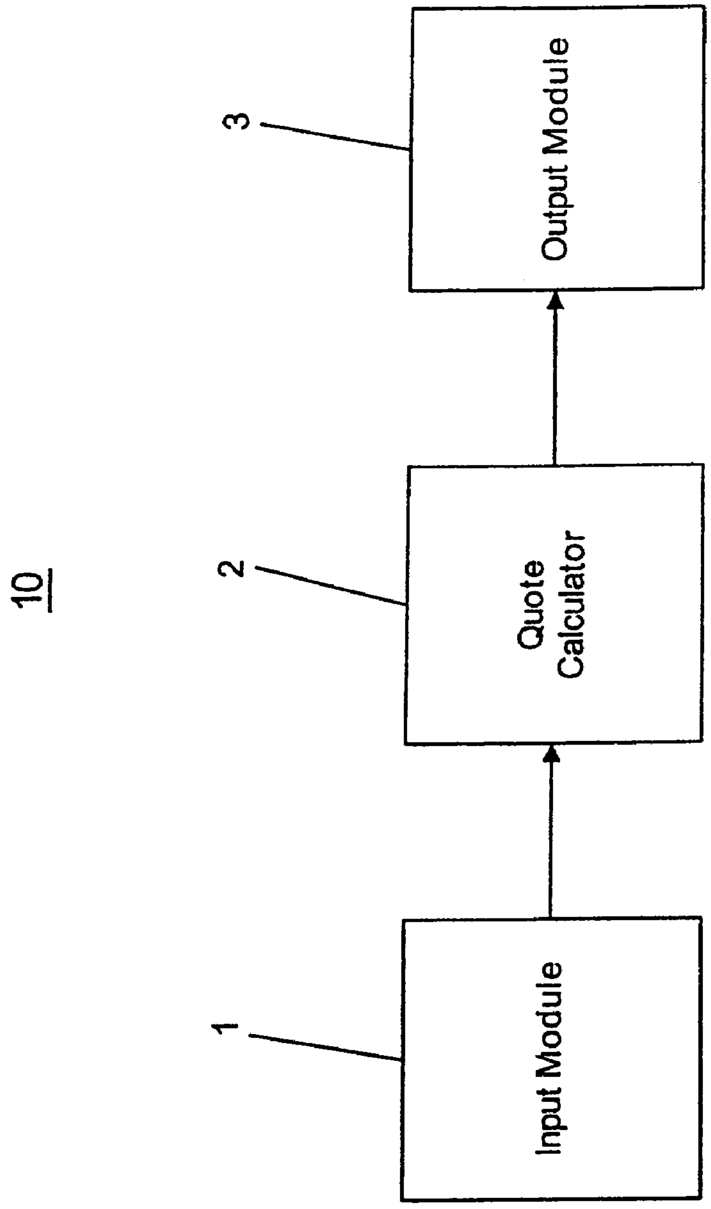
FIG. 1 is a block diagram illustrating a quoting system for a retirement benefit according to the present invention.

Reference will now be made in detail to the present preferred embodiments of the invention, examples of which are illustrated in the accompanying drawings in which like reference numerals refer to corresponding elements.

The present invention is described in relation to a defined benefit account or plan imbedded within a defined contribution account or plan. Nonetheless, the characteristics and parameters pertaining to the systems and methods may be applicable to other types of annuities and other financial instruments.

An annuity is a flexible tax-deferred retirement investment product that can provide long term earnings for an investor (“user” or “recipient”). An annuity allows a user’s retirement savings to grow on an income tax-deferred basis and allows the user to choose a payout option that best meets the user’s need for income when the user retires. Payout options may include a lump sum payment, a plurality of payments, income for a remainder of the user’s life, or a plurality of income payments paid out over a certain period of time. The portable retirement annuity described herein will be an annuity providing a plurality of income payments for the remainder of the user’s life, for a period not less than a defined certain number of years, or for some combination of the two.

When a user purchases an annuity, also known as a long-term investment contract, the user typically pays an insurer an initial sum of money (called a premium or principal) and the insurer invests that principal in an investment type of financial product to earn a return on that principal. In return for the initial sum of money, or premium payment, and the use of that initial sum of money, the insurer guarantees the user either a steady stream of income payments with no upside earnings potential or a stream of income payments adjusted for market performance (but generally not both) beginning at a specified date in the future and lasting for a specified period of time. While the premium payment is invested in the investment vehicle, the premium payment grows or compounds over time, but the user does not have to pay any taxes on the earnings. This phase of an annuity contract is referred to as an accumulation period. Once the user has accumulated an amount of money the user requires for retirement, the user can begin to receive periodic income payments made from the accumulated investment premium. Only when the user begins to receive income payments are the moneys subject to taxes. One disadvantage to a typical annuity contract, however, is that it typically has a date which, if the user wishes to withdraw his/her moneys prior to such date, the user will be penalized and will have to pay the insurer a surrender charge (we will refer to this date as the “surrender charge period date”). Additionally, if the user withdraws his/her money out of the annuity investment vehicle account prior to age 59½ years, other than as a series of periodic payments, the Internal Revenue Service also requires payment of a penalty since he/she had obtained the benefit of tax-deferred treatment during the time the moneys were invested.

There are several standard types of annuity contracts which insurers offer. A fixed annuity is an annuity where the insurer guarantees the user the invested principal value and a payment of a fixed rate of return for a stated period of time on the premium payment invested during the accumulation period and a guaranteed income for life if the user “annuitizes” or converts the annuity into a stream of regular income payments. The insurer takes responsibility for investing the user’s premium payment in whatever types of financial products it believes will earn enough income to enable it to meet its obligations under its guaranteed rate of return to the user. Assuming that the user holds the annuity contract until after the surrender charge period date, the benefit of such a fixed annuity contract to the user is in having a guaranteed income payment stream over a long period of time. The user is essentially betting that he/she will live a longer period of time than expected and will therefore realize a substantially higher amount of money in the guaranteed income payments than the initial premium payment. On the other hand, the insurer is betting on the opposite scenario, i.e., that it can make favorable investments of the premium payments which result in increased earnings and that the users, as a class, will not live longer than expected.

Fixed deferred annuities are popular because of their safe and predictable rates of return. Insurers often place fixed annuity contract premium payments into bonds or other conservative types of investment vehicles. Since fixed deferred annuities guarantee a specific return on the initial investment and a guaranteed return of principal, they are attractive to potential investors when the equity stock market is underperforming and interest rates are on the rise. However, under fixed deferred annuity contracts, the user is generally not advised of and does not participate in the insurer's investment choices and thus has to trust the insurer to make wise investment decisions. Moreover, under recent economic conditions, fixed deferred annuities have not been a popular choice as users have preferred to participate in the equity stock markets with the expectation of a higher rate of return on investment, but with the full knowledge that their principal may be at risk.

Variable deferred annuities have become more popular in recent years. With a variable deferred annuity contract, the user can decide how his/her premium payment will be allocated among a specific menu of investment vehicles, or sub-accounts, offered by the insurer. Sub-accounts are pooled investments of a number of users, similar to mutual funds, with varying investment objectives and strategies and typically have a professional fund manager similar to managers of mutual funds. The manager of the sub-account will decide where to invest the pooled funds based upon the objectives of the particular sub-account, e.g., growth, emerging industries, bonds, etc. The accumulated moneys in the annuity account of the user fluctuate with market values and with the user's choice of sub-accounts.

Variable deferred annuities have advantages over fixed deferred annuities since they enable the user to direct how his/her premium payment will be invested among one or more sub-accounts. Moreover, variable deferred annuities could potentially enable the user to earn more money on the initial investment than he/she could with a fixed deferred annuity contract if the user selected strong sub-accounts with high rates of return on investment. However, the variable deferred annuity contract makes no guarantees to the user regarding the amounts earned on the premium invested, the value of invested principal or the income amount to be paid out after the accumulation period, so the user could also potentially end up earning less money than desired if the sub-accounts selected by the user are weak or perform poorly. Since the value of the variable deferred annuity is tied to the risks inherent in the stock market, a downturn in the stock market could cause the value of the variable deferred annuity to drop. Thus, variable deferred annuities are not desirable to those users who are risk averse.

There are also fixed immediate annuity contracts. Purchasing a fixed immediate annuity requires a lump sum premium payment. The amount of retirement income is determined at the time of purchase and the retirement income can be paid out over the life of the user, over a certain period of time, or over a combination of the two. Retirees often purchase a fixed immediate annuity with funds they receive from 401(k) plans, Individual Retirement Accounts ("IRAs"), savings account funds, the cash value or death proceeds from a life insurance policy or proceeds from the sale of a home. The insurer issuing the fixed immediate annuity guarantees payments directly to a user on a monthly, quarterly, semi-annual or annual basis for the life of the user, for a certain period of time, or for some combination of the two. At the time of purchase, the income payments are locked based upon current market interest rates. The user's income payments are determined by, among other things, a combination of the market interest rate, the payment options selected by the user, the premium payment amount and the life expectancy of the user. Once the lump sum premium payment is made, the user has exchanged the lump sum premium payment for a series of guaranteed payments that will not change as a result of market performance. With a fixed immediate annuity, the user does not have any input concerning how the lump sum premium payment is invested.

A variable immediate annuity, like a fixed immediate annuity, guarantees income over the life of the user, for a certain period of time, or for a combination of the two. However, unlike a fixed immediate annuity where the income payments are fixed and do not vary, the income payments received from the variable immediate annuity vary based on market performance. The user could potentially earn more or less on a variable immediate annuity because of the equity investments. However, as will be shown below, the invention includes a system and method for guaranteeing a minimum periodic retirement income payment amount using an adjustment account, notwithstanding the unpredictable return associated with a variable immediate annuity.

In one embodiment of a process according to the present invention, an insurer is able to combine favorable features of each of the above-described annuities into a single retirement annuity product, i.e., a guaranteed payment stream in a manner similar to a fixed immediate annuity; a guaranteed retirement income amount in a manner similar to a fixed immediate annuity; an upside potential for a return on investment during the accumulation period in a manner similar to a variable deferred annuity; and a potential to realize an increased retirement income amount based on equity market performance in a manner similar to a variable immediate annuity.

In another embodiment, pursuant to a risk mitigation process of the present invention, an insurer may offer a guaranteed minimum retirement income amount to a user by eliminating the inherent economic uncertainties associated with traditional deferred and immediate annuities. By having the user predetermine before purchase of a retirement annuity product a desired retirement date and a predictable premium payment amount and a schedule of premium payments, the insurer is able to lower the cost to the user of the guaranteed minimum retirement income amount.

FIG. 1 is a block diagram illustrating one embodiment of a quoting system 10 for retirement benefits according to the present invention. The quoting system 10 may include a quote calculator 2, an input module 1 and an output module 3. The input module 1 and the output module 3 are shown for illustrative purposes only. In one embodiment, either the input module 1 or the output module 3, or both, may be a part of the quote calculator 2. The quoting system 10 may be used to provide a quote to a user on one or more parameters relating to a purchase or a contract for a retirement annuity product.

The input module 1 may receive information input by a user or an agent on behalf of a user regarding the user and one or more retirement desires of the user. In one embodiment, the input information may include two of a retirement date, a minimum retirement income amount the user would like to receive, or a defined premium payment amount the user would like to make towards the user's minimum retirement income amount. In one embodiment, the input information may include a retirement date, a minimum retirement income amount, a premium payment amount, a current age of the user, a gender of the user, and an indication of whether a retirement annuity will be a joint retirement annuity (i.e., based on two lives) or a single retirement annuity (i.e., based on one life). Additionally, in one embodiment, the input information may include an indication of whether the user would like to add one or more riders to the retirement annuity contract and/or the type of rider(s) to be added. The riders available to the user may include a disability rider, an unemployment rider and an early death rider as described below with reference to FIG. 3.

In one embodiment, an agent or a software program may help the user to determine the retirement date, the minimum retirement income amount the user would like to receive or the defined premium payment amount the user would like to make. In one embodiment, the input module 1 may represent a screen of a software program or a web page.

The quote calculator 2 may include hardware and/or software to calculate retirement account information. Given two of the user's retirement date, the minimum retirement income amount or the defined premium payment amount as inputs, the output module 3 may calculate the other one of the retirement date, a premium payment amount required to meet the user's minimum retirement income amount or the retirement income amount that would be paid to the user based on the defined premium payment amount the user would like to make, depending on the one not input by the user to the input module 1. For example, if the user chooses to input the user's retirement date and the desired minimum retirement income amount, the output of the quote calculator 2 would be the required premium payment amount to achieve the minimum retirement income amount. If the user chooses to input the retirement date and the desired premium payment amount, the output of quote calculator 2 would be the minimum retirement income amount available to the user based on the defined premium payment amounts the user would like to make. However, if the user chooses to input the desired premium payment amount and the minimum retirement income amount, the output of the quote calculator 2 would be the user's retirement date.

In one embodiment, the output of the quote calculator 2 may include a retirement annuity contract. In one embodiment, the user may be presented with a quote for the purchase of a proposed retirement annuity contract including terms meeting the parameters input by the user. The quote may be presented to the user as a web page or another similar type of user interface.

In one embodiment, the quote calculator 2 may base the premium payment amount quote or the minimum retirement income amount quote on an annuity accumulation period defined by the user's retirement date and the date of the quote. In one embodiment, the quote for the minimum retirement income amount will guarantee that the user is paid the minimum retirement income if the user pays the premium payment amount at each of a plurality of predetermined payment intervals, for example, a plurality of monthly payment intervals. In one embodiment, the premium payment amount or the minimum retirement income amount may be calculated by using at least one equity performance factor such as a stock index. Additionally, the minimum retirement income amount may be varied depending on a sales channel pursuant to which a sale of an annuity contract is made. For example, if the sale of the annuity contract was made direct to a consumer (e.g., via an Internet web site) without an agent, an insurer offering such annuity contract can pass its distribution savings realized by virtue of not having to deal with the agent onto the consumer in the form of a higher guaranteed minimum retirement income.

In one embodiment, the output module 3 may also output a cost breakdown including a retirement income amount, a disability income rider charge, an unemployment income rider charge, an early death rider charge, a lump sum equivalent, an interest rate lock period and a buy-down option where the user can buy-down the premium payment amount incrementally. In one embodiment, if the user has a choice of either a paid-up option or a partially paid-up option for the early death rider, the output module 3 may output a quote including each of these options. In another embodiment, the user may input a choice of a type of early death rider and the output module 3 may output only a cost of the type of early death rider chosen by the user.

In one embodiment, the user may input information in a software program or a web page, including a name, an address, a Social Security or tax ID number, a beneficiary, a qualified/nonqualified pension plan, and a 1035 Exchange replacement (i.e., referring to a tax-free exchange pursuant to Section 1035 of the Internal Revenue Code). An output of the quote calculator 2 may include a signature ready application for purchase of the quoted annuity product. The signature ready application may be an electronic signature ready application that may either be printed out and signed or affixed with an electronic signature and submitted over a network, such as the Internet. The output may also include a pre-authorized check approval form pursuant to which a bank or financial institution may automatically withdraw the premium payment amount from the user's account for payment of the premium payment amounts when due. The output may further include a transmittal sheet for transmittal of the completed electronic application to a broker/dealer.

In one embodiment, the retirement income amount or annuity payment may be a joint annuity payment, for example, for a legally married couple. In one embodiment, a minimum retirement income amount may be guaranteed for either a single lifetime period or a joint lifetime period. In another embodiment, the minimum retirement income amount may be guaranteed for a single lifetime period or a joint lifetime period with a predetermined certain period for the annuity payments. The predetermined certain period may be measured from a date at which annuity payments or transmission of the retirement income to the user begins. For example, the predetermined certain period may be a ten year certain period where, if the user of the annuity dies before the end of the predetermined certain period, a beneficiary designated by the user will receive the annuity payment until the end of the predetermined certain period.

In one embodiment, a minimum retirement income amount or the defined premium payment amount may be dependent upon both a mortality rate and an interest rate. In one embodiment, the minimum retirement income amount will be guaranteed independent of the user's employer. Thus, the minimum retirement income amount described herein is fully portable if the user changes employers.

Figure 2:
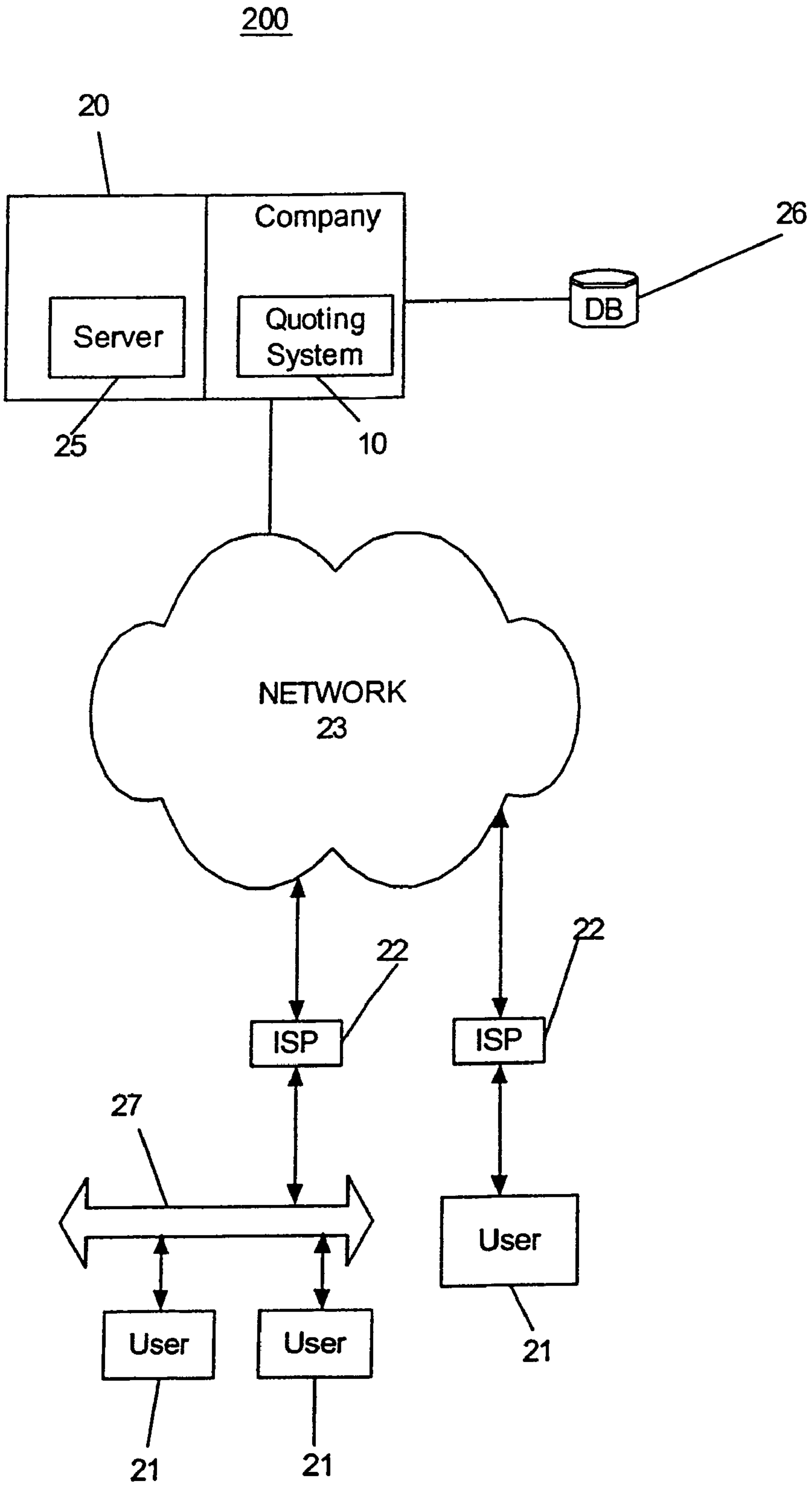
FIG. 2 is a block diagram illustrating one embodiment of an overall system in which the quoting system of FIG. 1 may be implemented.

FIG. 2 is a block diagram illustrating one embodiment of a network 200 in which the quoting system 10 of FIG. 1 may be implemented. In this embodiment, the quoting system 10 may be available to a plurality of users 21 through a network 23, which may be the Internet. The system 200 may include a company site 20, an internet service provider (ISP) 22 and the users 21. The users 21 may communicate with the company site 20 through the network 23. The users 21 may be connected to the network 23 through the ISP 22. In one embodiment, the users 21 may be coupled to the ISP 22 through a communications link 27. In another embodiment, a user 21 may be coupled directly to the ISP 22.

The communications links 23 and 27 may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection. The communications links 23 and 27 may also include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. The communications links 23 and 27 may further include or interface to any one or more of an RS-232 serial connection, an IEEE-1394 (Firewire) connection, a Fibre Channel connection, an infrared (IRDA) port, a Small Computer Systems Interface (SCSI) connection, a Universal Serial Bus (USB) connection or another wired or wireless, digital or analog interface or connection.

Although only three users 21 are shown in FIG. 2, in actual practice, there may be fewer or significantly more users 21 connected to the system 200 than shown. Additional users 21 may be connected through the same ISP 22 shown or through other ISPs 22. However, for purposes of illustration, the discussion will assume the three users 21 connected to the network 23 through the two ISPs 22.

Although any network may be used for the system 200, for the purpose of illustration, the users 21 and the company site 20 may be connected to the Internet 23. The users 21 may be connected to the ISPs 22 through client computer systems having resident therein at least one user interface (UI) application module. In one embodiment, the UI application module may include an internet browser, such as a Netscape Navigator™ browser or a Microsoft Internet Explorer™ browser. The users 21 may further include an email communication application module, such as a Microsoft Beyond Mail™ application, a Netscape Mail™ application, a Eudora Pro™ application or the like.

The users 21 may be comprised of a personal computer running a Microsoft Windows™ 95 operating system, a Microsoft Windows 98 operating system, a Microsoft Windows XP™ operating system, a Millenium™ operating system, a Microsoft Windows NT™ operating system, a Microsoft Windows 2000 operating system, a Microsoft Windows™CE™ operating system, a PalmOS™ operating system, a Unix operating system, a Linux operating system, a Solaris™ operating system, an OS/2™ operating system, a BeOS™ operating system, a MacOS™ operating system, or another similar operating system or platform. The users 21 may also include a microprocessor such as an Intel x86-based device, a Motorola 68K device, a PowerPC™ device, a MIPS device, a Hewlett-Packard Precision™ device, a Digital Equipment Corporation Alpha™ RISC processor, a microcontroller or another general or special purpose device operating under programmed control. The users 21 may further include an electronic memory such as a random access memory (RAM), an electronically programmable read only memory (EPROM), a storage such as a hard drive, a compact disk read only memory (CDROM), a rewritable CDROM or another magnetic, optical or other storage medium, and other associated components connected over an electronic bus, as will be appreciated by persons skilled in the art. The users 21 may also include a network-enabled appliance such as a WebTV™ unit, a radio-enabled Palm™ Pilot or similar unit, a set-top box, a networkable game-playing console such as a Microsoft XBOX™, Sony Playstation™ or Playstation II™ console or a Sega Dreamcast™ console, a browser-equipped cellular telephone, or another TCP/IP client or other device.

The users 21 may represent client systems used by customers or users, or agents of the company site 20. The company site 20 may include the quoting system 10, a server 25 and a database 26. The quoting system 10 may be the quoting system 10 of FIG. 1.

The server 25 may include a workstation running the Microsoft Windows™ NT™ operating system, the Microsoft Windows™ 2000 operating system, the Unix operating system, the Linux operating system, a Xenix operating system, an IBM AIX™ operating system, a Hewlett-Packard UX™ operating system, a Novell Netware™ operating system, a Sun Microsystems Solaris™ operating system, the OS/2™ operating system, a BeOS™ operating system, an Apache operating system, an OpenStep™ operating system or another operating system or platform.

Although the database 26 is shown to be outside of the company site 20, the database 26 may reside within the company site 20 in one embodiment. The database 26 may include or interface to an relational database such as that sold commercially by Oracle Corporation. Other databases, such as an Informix™ database, a Database 2 (DB2) database, a Sybase database, an On Line Analytical Processing (OLAP) query format database, a Standard Query Language (SQL) format database, a storage area network (SAN), a Microsoft Access™ database or another similar data storage device, query format, platform or resource may be used.

The database 26 may be used to store one or more algorithms used to calculate the quote for the premium payment amount or the retirement income amount requested by the user 21. The database 26 may also store one or more tables, charts, investment information, information needed to generate web pages, and any other data needed to generate the quote described with reference to the output module 3 of FIG. 1.

Figure 3:
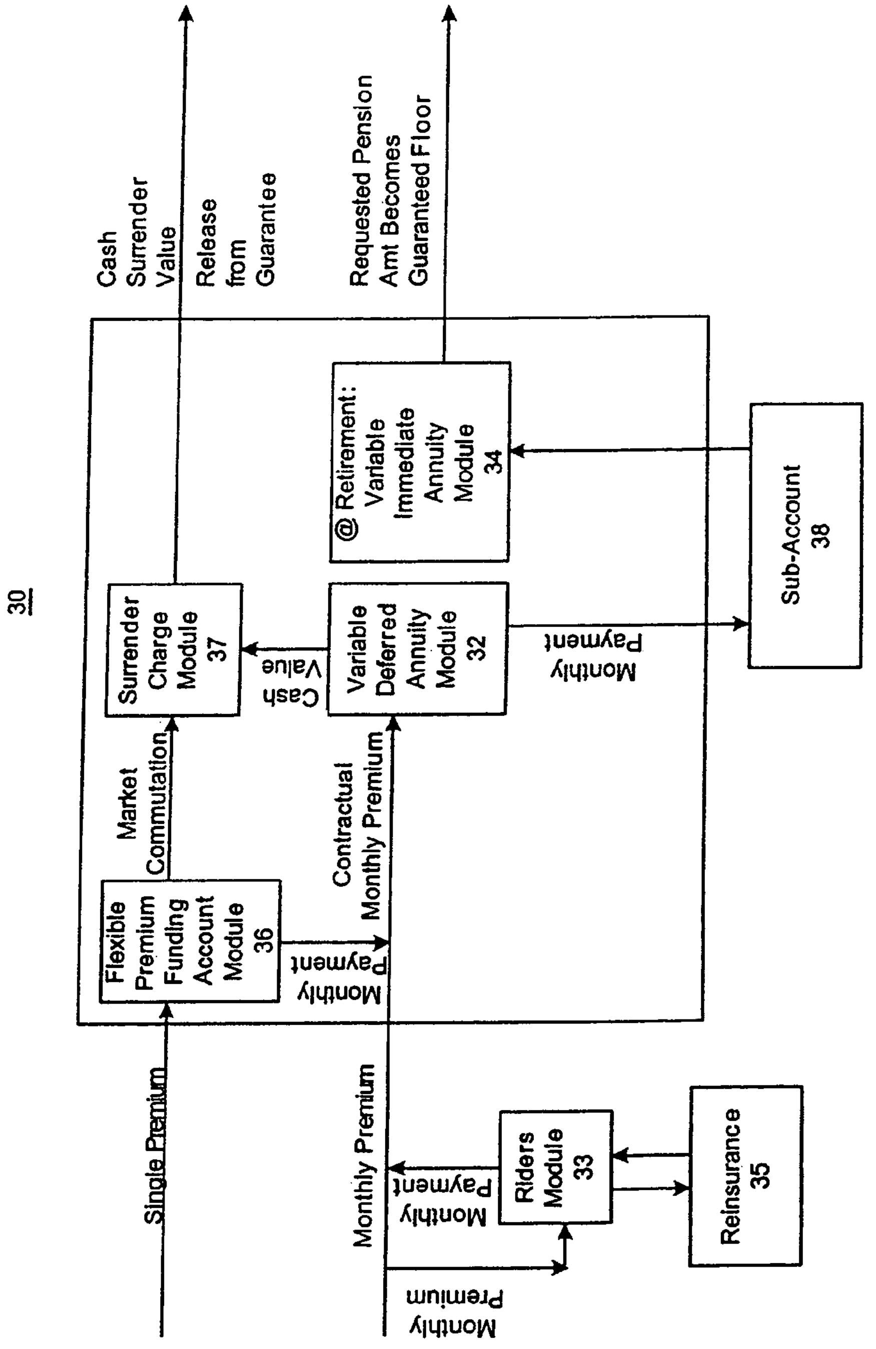
FIG. 3 is a block diagram illustrating one embodiment of a system for providing a user with periodic retirement income payments.

FIG. 3 is a block diagram illustrating one embodiment of a portable guaranteed annuity system 30 for providing a user with a plurality of retirement income payments. In one embodiment, the portable guaranteed annuity system 30 may include a variable deferred annuity ("VDA") module 32 and a variable immediate annuity ("VIA") module 34. One or more premium payments received into the system 30 may be placed into the variable deferred annuity module 32.

As explained above, a variable annuity is a contract in which the premiums paid are invested in one or more stock and bond sub-accounts. A variable annuity account value reflects the performance of the investment funds selected. Over the long-term, premiums invested in equity stock funds generally reflect the growth and performance of the economy and can serve as a hedge against inflation. A deferred annuity contract is generally one in which one or more annuity payouts begin at a future date. An immediate annuity contract is generally one in which annuity payouts begin immediately or within one year. Thus, a variable deferred annuity is generally a variable annuity in which the annuity payouts begin at a future date and a variable immediate annuity is generally a variable annuity in which the annuity payouts begin immediately.

In one embodiment, the premium payments may be received periodically where the period is defined by an annuity contract. For example, the annuity contract may define a monthly periodic premium payment. In one embodiment, the user's contractual monthly premium payment may be paid into a variable deferred annuity account through an electronic funds transfer. In another embodiment, the user may be billed on a periodic basis for the contractual premium payment amount.

In one embodiment, the contractual monthly premium payment may be deposited into a predetermined sub-account 38 of the variable deferred annuity module 32. The predetermined sub-account 38 may mirror a pension fund management style. At completion of a contractual accumulation period, the monetary value invested in the predetermined sub-account 38 may be transferred to the variable immediate annuity module 34 for payout to the user.

If the amount accumulated in the predetermined sub-account 38 is greater than an amount needed for a guaranteed minimum retirement income amount, the company 20 and the user 21 share the excess earnings. Thus, the user 21 may receive an amount greater than the guaranteed minimum retirement income amount during the annuity period. If the amount accumulated in the sub-account 38 is less than the amount required to achieve the guaranteed minimum retirement income amount, the company 20 will pay the user 21 an amount equal to the guaranteed minimum retirement income amount. As will be shown below, one aspect of the invention involves an adjustment account that may be used to guarantee a minimum periodic retirement income payment amount, even if the amount accumulated in sub-account 38, or any other income source, is less than what is needed to fund the guaranteed minimum periodic retirement income payments.

In one embodiment, the user 21 may choose one or more riders for inclusion in the annuity contract such as a disability rider, an unemployment rider or an early death rider. Thus, the system 30 may include a riders module 33 to receive a portion of the contractual monthly premium payment to cover any selected riders. In one embodiment, the riders may be administered by a reinsurance entity 35. In one embodiment, if the user 21 elects to include a disability rider in the annuity contract, the user 21 will be obligated to make one or more scheduled monthly rider premium payments for a predetermined period in order that the premium payments will be made from another source in the event of a disability period. If the user 21 elects to include an unemployment rider, the user will be obligated to make one or more scheduled rider premium payments for a predetermined period to ensure that the premium payments will be made from another source in the event the user has an unemployment period. The rider premium payments cannot be transferred or withdrawn from the flexible premium funding account or from the sub-account. The rider premium payments must be paid from another source.

The period of premium payments for either of the disability rider and the unemployment rider may depend on the user's age and the user's age at disability or unemployment. In one embodiment, there may be an elimination period, such as, for example, 90 days before payments may begin. An appropriate rider or another provision may, therefore, be required in order that the premium payments will continue during the elimination period. Payments missed during the elimination period may either have a grace period charge paid by the rider or such a grace period charge may be waived pursuant to the terms of the annuity contract. The premium payments may vary based on at least one of a plurality of factors including an age of the user, a gender of the user, a length of time of the accumulation period, an occupation of the user, and a scheduled premium payment amount.

In one embodiment, the early death rider for annuity contracts with joint owners will pay the remaining monthly premium payments in the event one of the joint owners dies before an annuity payment start date. This is a decreasing term insurance rider that may be issued as a single life annuity contract or a joint life annuity contract.

In one embodiment, the user 21 may choose to pay a single premium which fulfills the total premium payments to be paid over the annuity contractual accumulation period. In this embodiment, the single premium may be deposited into a flexible premium funding account in a flexible premium funding account module 36. In this embodiment, money from the flexible premium funding account may be transferred to the user's variable deferred annuity account in the variable deferred annuity module 32 periodically according to the user's annuity contract. For example, if the user has a contract requiring monthly premium payments, the user's entire monthly premium payment may be transferred to the user's variable deferred annuity account at each of the preset payment intervals.

In one embodiment, the user 21 may choose to pay the defined premium payment amounts at the preset payment intervals through electronic funds transfer. In another embodiment, the user 21 may choose to pay the defined premium payment amounts at the preset payment intervals via manual check and may incur a monthly billing charge.

In one embodiment, each user's flexible premium funding account may be used to buy-down an amount of the user's monthly premium payment. In this embodiment, the same amount will be transferred from the user's flexible premium funding account to the user's variable deferred annuity account every month until the end of the user's contractual accumulation period. Thus, if the user's monthly premium payment amount is $1,000 and the user's flexible premium funding account is used to contribute $300 per month towards payment of that $1,000 monthly premium payment, the user will pay $700 a month in addition to the $300 amount contributed from the user's flexible premium funding account. In this embodiment, the company 20 may notify the user 21 when the user 21 must make new arrangements to make the monthly premium payments. In another embodiment, the user 21 may make more than one single premium payment to the user's annuity account. In such embodiment, each single premium payment made by the user 21 will be put into a separate user account in the flexible premium funding account module 36.

In one embodiment, if the user 21 misses a premium payment and the premium payments are not paid with interest within a predetermined time period, the user may forfeit the contract guarantee of the retirement annuity contact.

In one embodiment, premium payments allocated to be paid from the user's flexible premium funding account may be transferred monthly from the user's flexible premium funding account to the user's variable deferred annuity account based on a predetermined formula for allocation.

In one embodiment, the user 21 may choose to be released early from the annuity contract. In such embodiment, the system 30 may include a surrender charge module 37. The surrender charge module 37 may deduct a surrender charge from a cash value amount of the user's VDA in the variable deferred annuity module 32. The surrender charge may be based upon the length of the annuity contractual accumulation period and a time period remaining left in the contractual accumulation period at a date when the user 21 requests to be released early from the annuity contract.

In one embodiment, if the user 21 has a flexible premium funding account at the time the user 21 requests to be released early from the annuity contract, a market commutation value of the amount in the user's flexible premium funding account will be transmitted to the user 21. In one embodiment, a surrender charge may first be deducted from the market commutation amount in the user's flexible premium funding account. In another embodiment, the market commutation value of the user's flexible premium funding account will not be subject to any surrender charge.

In one embodiment, the user 21 may be allowed to withdraw funds from the user's retirement annuity account. In one embodiment, if withdrawals made from the user's annuity account are not repaid within a predetermined time period, the user's retirement annuity contract may forfeit the contract guarantee. In another embodiment, the withdrawal payments may be subject to surrender charges.

In one embodiment, if the user has a flexible premium funding account, the withdrawals will first be taken from the sub-account. In some cases, withdrawals of this type may be subject to a commutation charge. Withdrawals coming from the user's flexible premium funding account may be taken out on a first-in first-out basis, according to one embodiment.

Figure 4:
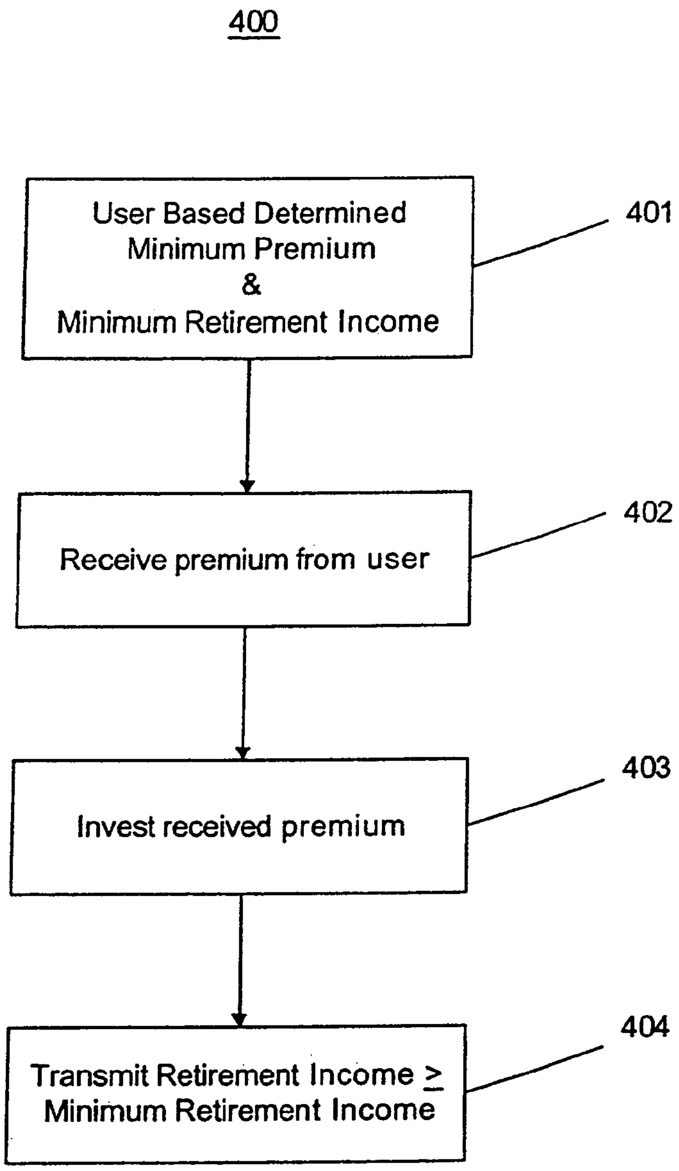
FIG. 4 is a flow diagram illustrating one embodiment of a process for providing a user with periodic retirement income payments.

FIG. 4 is a flow diagram illustrating one embodiment of a process 400 for providing a user 21 with a plurality of retirement income payments. At step 401, the user 21 may input a desired premium payment amount and a minimum retirement income amount in a portable guaranteed annuity system 30.

At step 402, the system 30 receives a premium payment from the user 21. In one embodiment, the step 402 of receiving the premium payment from the user may include a step of receiving a monthly premium payment from the user 21. In one embodiment, the premium payments received from the user 21 may include a premium tax, such as, for example, state-specific charges. In another embodiment, the received premium payment may include a monthly billing charge for billing the user 21. In yet another embodiment, the premium payments received from the user 21 may include premium payments associated with riders. At step 403, the system 30 invests the received premium payment.

At step 404, the system 30 may transmit the accumulated retirement income to the user 21. In one embodiment, the step 404 of transmission of the retirement income may include a step of placing at least a portion of the user's account value accumulated in the variable deferred annuity module 32 into the variable immediate annuity module 34.

The step 404 of transmission of the accumulated retirement income to the user 21 may begin at a user-defined annuity payment start date. In one embodiment, the annuity payment start date may be required to be at least ten years after an annuity contract start date. Until then, the premium payments remain invested in a variable deferred annuity. The form of the variable immediate annuity once payments begin and parameters relating to the user 21 upon which it is based must be determined at the contract start date. In one embodiment, the form of the VIA may not be changed. In another embodiment, the form of the VIA may be changed but the user 21 may forfeit the contract guarantee.

In one embodiment, the form of the VIA may be changed in relation to legal marriages and qualified domestic relation orders (QDROs) relating to the user. These changes may include 1) a single user/annuitant may be allowed to add a spouse to the VIA if the marriage occurs after the contract start date, in which case the benefit may be recalculated; and 2) if the spousal joint owner/annuitants get divorced after issue and the contract is split by a QDRO, the company may split the contract into two single contracts proportionally (benefits, premiums and contract values).

The invention also permits a user (or recipient) to derive the benefits associated with variable and fixed annuities. As was discussed above, the former offers the user the potential of earning more, while the latter guarantees the reliability of a fixed income. Using the various systems and methods described above, a user is further able to receive excess returns realized by the user's annuities without having to sacrifice the benefit of the guaranteed payment floor. In one embodiment, an adjustment account is used to monitor and track payments made to the user in order to meet the guaranteed minimum periodic retirement income payment amount. In another embodiment, the adjustment account may also be used to store as a balance the difference between the guaranteed minimum periodic retirement income payment amount and the benefit level actually realized by the annuity over a certain period of time.

For example, assume the guaranteed minimum periodic retirement income payment amount selected by the user is $2,000 monthly. Assume further that the variable immediate annuity selected by the user only returned a benefit level of $1,500 for a particular month. In this case, the provider may pay the user the guaranteed $2,000 by paying the benefit level realized plus an additional $500. The adjustment account may then reflect a balance of $500 indicating the amount paid to the user over and above the benefit level realized by the annuity. The adjustment account may reflect a larger balance if past excess payments had previously been stored.

According to another embodiment, the adjustment account balance may also be decreased if the benefit level realized by the variable immediate annuity is greater than what was assumed in determining the guaranteed minimum periodic retirement income payment amount. In this instance, any balance remaining in the adjustment account is recovered before the user receives any excess returns. For instance, assume that in the above example the variable immediate annuity returns a benefit of $3,000 in the month following the $500 adjustment payment. In this case, before the user is paid, the balance remaining in the adjustment account is recovered. The user may then be paid $2,500, or whatever amount is dictated by an agreement between the user and the provider. Put another way, if at any time the adjustment account reflects a balance, the carrier has a secured interest in future annuity performance (i.e., returns), which may then be used by the administrator, e.g. financial services carrier, to recover part or all of the outstanding adjustment account balance.

The above examples relate to a variable immediate annuity as the equity-producing product that produces the benefit level realized. However, the invention may also be practiced using other equity-producing products, such as variable and fixed annuities, mutual funds, variable life, single premium immediate annuities (SPIAs), and immediate variable annuities. Further, the benefit level realized and the guaranteed minimum periodic retirement income payment may be calculated on any period, such as annually, biennially, semi-annually, quarterly, monthly, bimonthly, semi-monthly, weekly, bi-weekly, etc.

In another aspect, the invention may also be used to convert an annuity living benefit into a death benefit. Certain current annuity guaranteed living benefits—like the guaranteed minimum periodic retirement income payment amount discussed above—are focused on guaranteeing performance at specific points during a recipient's lifetime. As described herein, the invention guarantees performance by treating the difference between performance of an equity-producing product and the guaranteed benefit as a receivable, which in one embodiment is indicated by an adjustment account balance. The guaranteed performance may be provided throughout a fixed period of time. For instance, in one embodiment of the invention, the recipient may receive the guaranteed benefit for the duration of the recipient's life, i.e. as a living benefit. In another embodiment, the recipient may receive the living benefit until the later occurring of the recipient's death or the expiration of a predetermined period certain that runs from the annuitization date. According to one embodiment, the period certain indicates a length of time following the annuitization date during which at least one beneficiary of the recipient continues to receive the guaranteed benefits, e.g. 5, 10, 15, 20 years after the annuitization date.

During the recipient's life, where a receivable (or adjustment account balance) is reflected, the carrier may recover the balance via a secured interest in future performance of the equity-producing product. That is, the carrier may recover the receivable during periods of positive performance (in relation to the guaranteed benefit) by the equity-producing product. However, when there is no more future—i.e., upon the later of the recipient's death or the end of the period certain—the carrier loses its secured interest in future performance of the equity-producing product and the receivable is contractually forgiven. Characterization of the payment as a receivable and the forgiveness upon death as the benefit effectively changes the accounting and economics of the guarantee from a living benefit that is subject to current (i.e., short-term) market fluctuation found in current products, to a forecasted death benefit based on long-term performance and life expectancy. In other words, the invention enables a carrier to pay down the receivable based on performance of the equity producing product, and to subsequently forgive the receivable upon the recipient's death or expiration of the period certain, whichever occurs later. Accordingly, this latter aspect of the invention—changing or transforming the guarantee from a living benefit to a death benefit—makes provision of the guarantee benefit much less expensive than currently available annuity guarantees.

Figure 5:
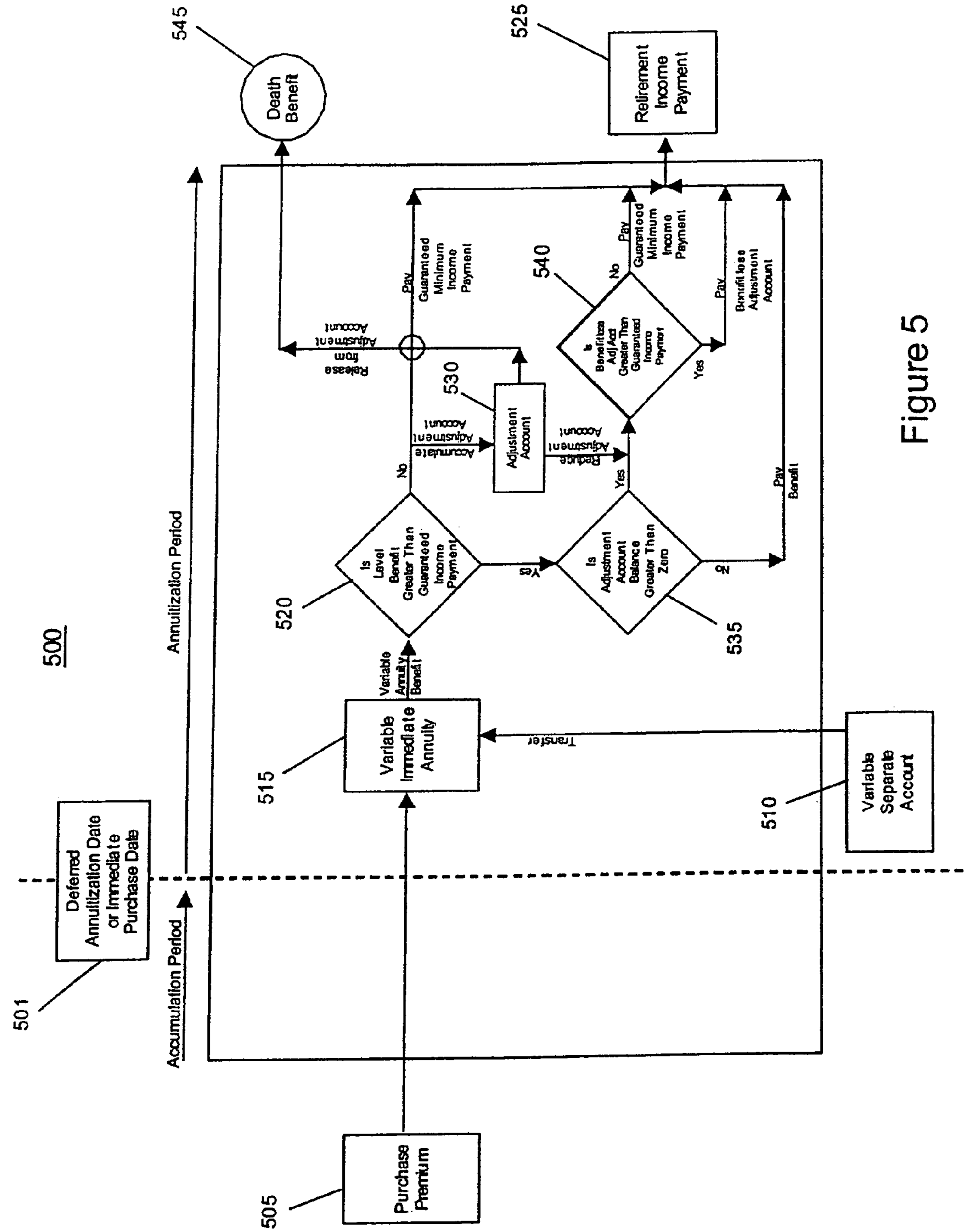
FIG. 5 is a flow diagram illustrating one embodiment of a process for guaranteeing a minimum periodic retirement income payment amount using an adjustment account as well as a guaranteed living benefit being transformed into a death benefit.

FIG. 5 is a flow chart diagram illustrating one embodiment of a method 500 for using an adjustment account 530. As shown, FIG. 5 is divided into two periods: the accumulation period and the annuitization period. Dashed line 501 divides the two periods and represents either the deferred annuitization date or the immediate purchase date, the former used in instances when the user pays periodic premium payments 505 and the latter when the user pays a single payment, such as a transfer of funds from variable separate account 510. In any event, line 501 indicates the date the user begins receiving periodic retirement income payments.

Variable immediate annuity 515 will return or pay out a benefit based on the investments comprising the account. At step 520, the benefit level actually realized by annuity 515 is compared to the guaranteed minimum periodic retirement income payment that, in one embodiment, is predetermined by the user. In another embodiment, the guaranteed minimum periodic retirement income payment is based on the total premium payments made during the accumulation period. If the benefit level received is less than the guaranteed minimum periodic retirement income payment, then the adjustment account balance is increased by an amount equal to the difference between the benefit level and the guaranteed minimum periodic retirement income payment. For instance, assume that the actual benefit realized by the annuity account is $5,000 and that the guaranteed minimum periodic retirement income payment was predetermined by the user to be $6,000. In this scenario the adjustment account 530 will show a balance of $1,000, the additional payment required to provide the user with the guaranteed minimum periodic retirement income payment. According to one embodiment, the comparison of the benefit level with the guaranteed minimum periodic retirement income payment may be made by an adjustment module, which may be associated with the annuity 515.

Returning to step 520, if the benefit level realized by the variable immediate annuity 515 is greater than the guaranteed minimum periodic retirement income payment, then at step 535 it is determined whether the adjustment account 530 shows a past balance. If it does, then a determination is made at step 540 as to whether the difference between the benefit level and the adjustment account balance is greater than the guaranteed minimum periodic retirement income payment, and, if it is, then the user is paid the difference between benefit level and the adjustment account balance. If, however, the difference between the benefit level and the adjustment account balance is less than the guaranteed minimum periodic retirement income payment, then the adjustment account balance is decreased by an amount equal to the difference between the benefit level and the guarantee minimum periodic retirement income payment. The user is then paid the guaranteed minimum periodic retirement income payment amount. According to one embodiment, steps 520, 535 and 540 are processed by an adjustment module, which may be associated with annuity 515. In yet another embodiment, should the user pass away during the annuitization period and/or the period certain, any adjustment balance is forgiven as a death benefit 545, as shown.

Figure 6:
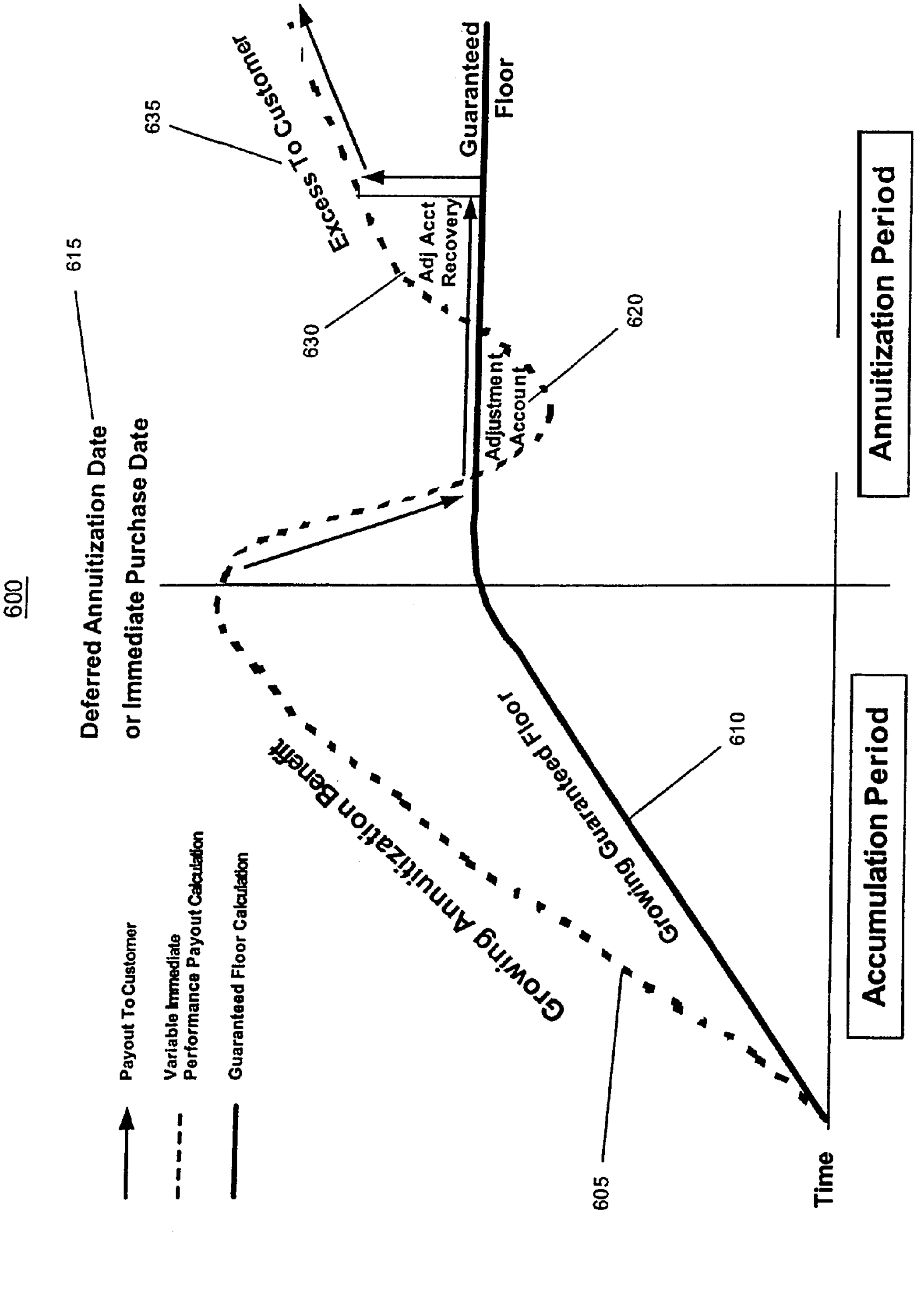
FIG. 6 is a chart illustrating one embodiment of a process for guaranteeing a minimum periodic retirement income payment amount using an adjustment account.

FIG. 6 is a Cartesian representation of the method of FIG. 5. Growing annuitization benefit 605 indicates the rising value of premium payments paid by the user during the accumulation period. As the premium payments increase, so does the guaranteed floor 610. Following the deferred annuitization or immediate purchase date 615, the benefit realized 605 will start to fluctuate depending on the returns realized by the annuity in which the premium payments have been invested. The guaranteed floor 610, however, will stabilize at a predetermined level. In one embodiment, the user may determine the guaranteed floor 610. In another embodiment, floor 610 may be determined by the total premium payments made during the accumulation period. Whenever the fluctuating return benefit 605 starts and remains greater than the guaranteed floor 610, the user receives the full amount of the benefit. However, should the benefit 605 drop below guaranteed floor 610, the adjustment account 620 will indicate a balance equal to the difference between the benefit level and the floor. The adjustment account balance will continue to grow should the future benefit payments continue to fall below the floor. If, however, the return benefits rise above guaranteed floor 610, then any excess realized benefits will be used by an administrator of the system to recover the outstanding adjustment account balance before any excess is paid to the user. Once the full outstanding adjustment account balance is recovered, the user will receive the full amount of the excess realized benefit, as shown at 635. In any event, however, the user is guaranteed a minimum periodic retirement income payment.

The following examples demonstrate operations of the method of FIGS. 5 and 6:

EXAMPLE 1

| | |
|---|---|
| Guaranteed Payment: | $2,000 |
| Benefit Level Realized: | $1,500 |
| Adjustment Account balance: | $400 |
| Action: User receives $2,000; Adjustment Account balance increased to $900 | |

EXAMPLE 2

| | |
|---|---|
| Guaranteed Payment: | $2,000 |
| Benefit Level Realized: | $2,000 |
| Adjustment Account balance: | $500 |
| Action: User receives $2,000; Adjustment Account balance remains at $500 | |

EXAMPLE 3

| | |
|---|---|
| Guaranteed Payment: | $2,000 |
| Benefit Level Realized: | $3,500 |
| Adjustment Account balance: | $500 |
| Action: User receives $3,000; Adjustment Account balance is recovered | |

EXAMPLE 4

| | |
|---|---|
| Guaranteed Payment: | $2,000 |
| Benefit Level Realized: | $3,500 |
| Adjustment Account balance: | $2,000 |
| Action: User receives $2,000; Adjustment Account balance reduced to $500 | |

Figure 7:
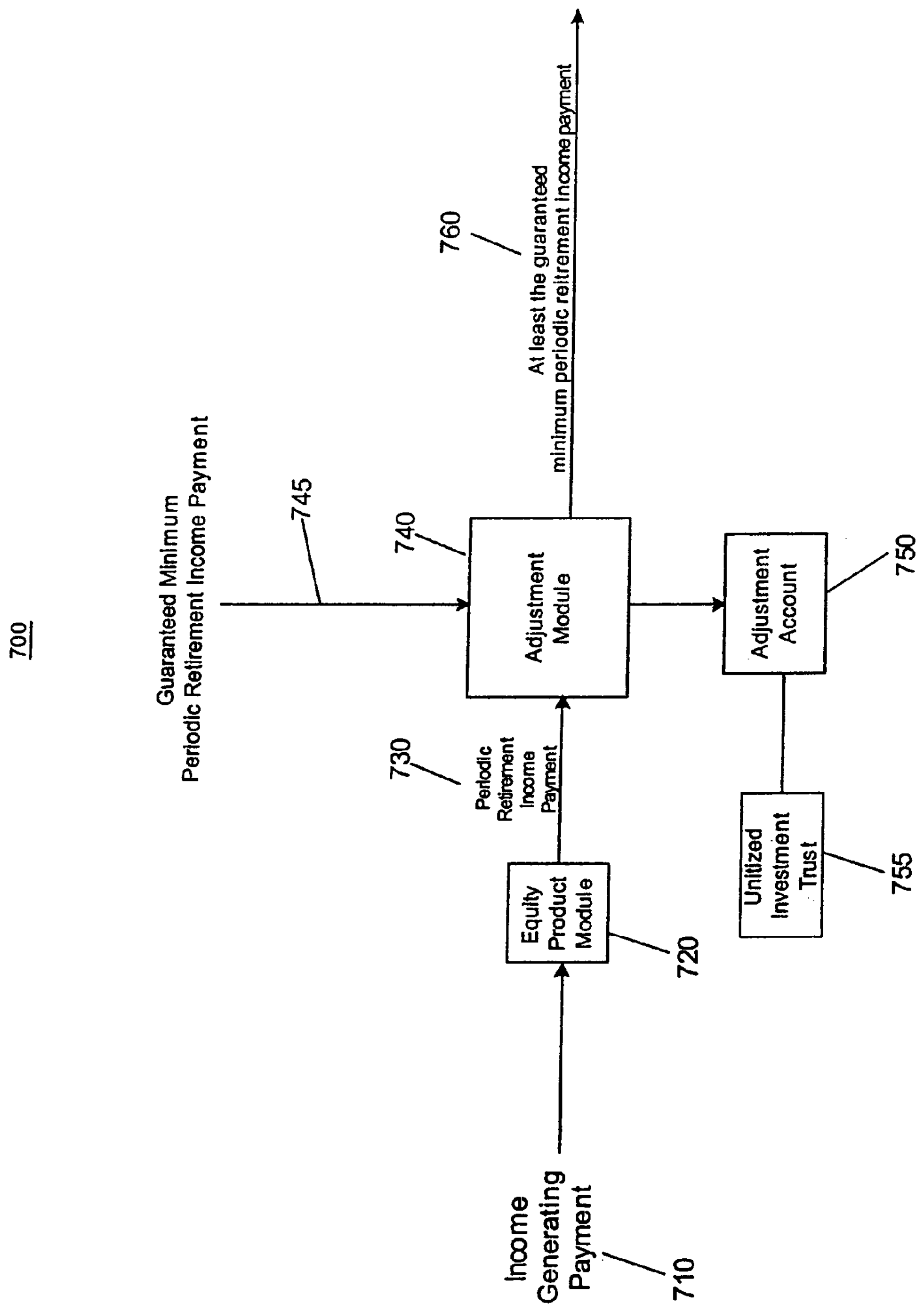
FIG. 7 is a block diagram illustrating one embodiment of a system for guaranteeing a minimum periodic retirement income payment amount using an adjustment account.

FIG. 7 illustrates an embodiment of a system 700 that may be used to guarantee a minimum periodic retirement income payment amount using an adjustment account. As shown, an income generating payment 710 is received at equity product module 720. In one embodiment, income generating payment 710 may be a single payment or a series of premium payments. In another embodiment, equity product module 720 may comprise any equity producing product(s) such as variable annuities, fixed annuities, mutual funds, variable life, single premium immediate annuities (SPIAs), immediate variable annuities, etc. Equity module 720 outputs a periodic retirement income payment 730, the amount of which is dependent on the investments comprising equity module 720. Periodic retirement income payment 730 may be calculated annually, biennially, semi-annually, quarterly, monthly, bimonthly, semi-monthly, weekly, bi-weekly, etc. Adjustment module 740 then receives the periodic retirement income payment 730 and compares it to the guaranteed minimum periodic retirement income payment, which may be predetermined by the user or by the total premium payments made during the accumulation period. As was discussed above, if the guaranteed minimum periodic retirement income payment 745 is greater than the periodic retirement income payment 730, then a balance will be stored in adjustment account 750 equivalent to the difference between the two. In one embodiment, the adjustment account balance may be recovered during instances when the periodic retirement income payment 730 is greater than the guaranteed minimum periodic retirement income payment, as discussed above in connection with FIGS. 5 and 6. In another embodiment, however, the adjustment account balance may be recovered from the performance of a unitized investment trust 755, or an index. In any event, adjustment module 740 outputs to the user at least the guaranteed minimum periodic retirement income payment 760.

Figure 8:
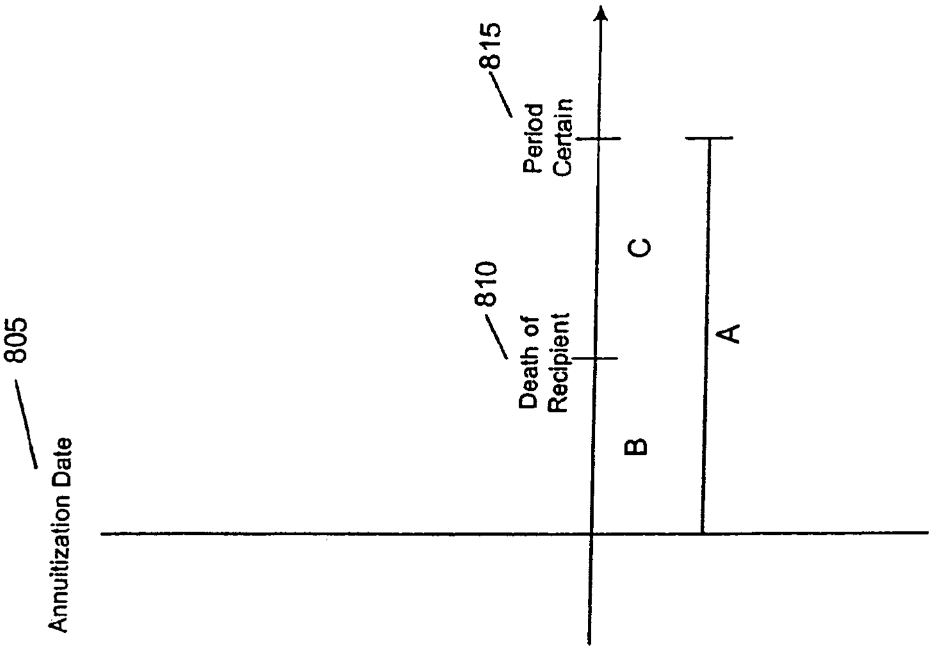
FIG. 8 illustrates a common practice to use a certain period payout, in addition to a life payout.

FIG. 8 illustrates one embodiment (recipient dies prior to completion of the period certain) of an aspect of the invention whereby a guarantee living benefit is transformed into a death benefit. As shown, the annuitization period comprises a period certain 815 having a total duration A, comprising phases B and C. During phase B—which runs from the annuitization date to the death of the recipient—the recipient receives the guaranteed living benefit as discussed in FIGS. 5, 6, and 7. During this time, the carrier retains a secured interest in the future performance of the equity-producing product, if the adjustment account reflects a balance. Phase C continues in the same way as phase B, except that the guaranteed benefit is received by at least one beneficiary of the recipient. During this time also, the carrier retains a secured interest in the future performance of the equity-producing product. At the expiration of the period certain, however, the carrier forgives any remaining account balance, thereby effectively transforming the guaranteed living benefit of phases B and C into a death benefit. Other embodiments are also contemplated for converting the living benefit into a death benefit. For example, the recipient may live until the expiration of the period certain, or the guaranteed benefit is paid to the recipient so long as the recipient is living (i.e., no period certain). In the former example, transformation occurs upon the expiration of the period certain and upon death of the recipient in the latter.

According to various other embodiments, the invention may comprise a defined benefit account or feature of a defined benefit plan (or DB Plan) embedded, for example, within a defined contribution plan (or DC Plan). A DB Plan is a retirement plan established by an employer group to ensure retirement security for its participants by guaranteeing a stream of income payments upon retirement. Under a DB Plan, the plan sponsor (e.g. employer) pools the assets and liabilities of the plan and takes on the responsibility to fund the plan adequately and provide retirement income guarantee. Under certain circumstances, the employer, for example, may take an immediate tax deduction for funding the DB Plan and the employee does not recognize taxable income until retirement income is received.

A DC Plan is a retirement plan established by an employer to ensure retirement security for its participants by making contributions on their behalf. Most DC Plans allow the participant to save for retirement by deferring a percentage of his or her compensation and by matching those savings to a certain degree with employer contributions. Under a DC Plan, the employer: (1) sets up individual accounts for each participant (e.g. employee), (2) facilitates participant savings through payroll deduction, (3) matches participant contributions, (4) credits the performance of the selected investment, and (5) tracks transactions into and out of the account. In a DC Plan, the employee is responsible for making the ultimate investment decision and for determining the best means for withdrawing funds during retirement. An employer group DC Plan is more commonly referred to as a 401(k), after the section of the IRS Code which regulates such plans. Under certain circumstances, the employer may receive a tax deduction for matching employee contributions. The employee may be allowed to exclude from current income any amounts contributed to the plan, but will incur taxes upon withdrawal. In addition, there may be penalties if the employee withdrawals accumulated value before retirement.

According to various embodiments, the invention brings together the portability and controllability of a DC Plan—e.g., an employer 401(k) plan or variable annuity product—with the security and predictability of a DB account or plan that guarantees a participant a minimum income payment(s) upon retirement (as used herein defined benefit account may refers to the defined benefit feature in a defined controibution plan.) In some embodiments, the defined benefit account is presented as one of several investment products into which a participant can invest all or portions of his or her savings. Thus, an employee participating in a 401(k) plan, for example, may select a defined benefit account as an investment option and obtain the security of a guaranteed minimum income payment(s) at retirement. The guaranteed income payment may be based on a retirement income factor which is quoted to the employee when contributions to the defined benefit account begin. The retirement income factor, or RIF, may be based on various factors, such as the employee's age, marital status, desired payout, retirement date, and any other relevant factors. The contributions or savings invested in the defined benefit account may be withdrawn or transferred to other investment options, at any time, including prior to retirement.

Figure 9:
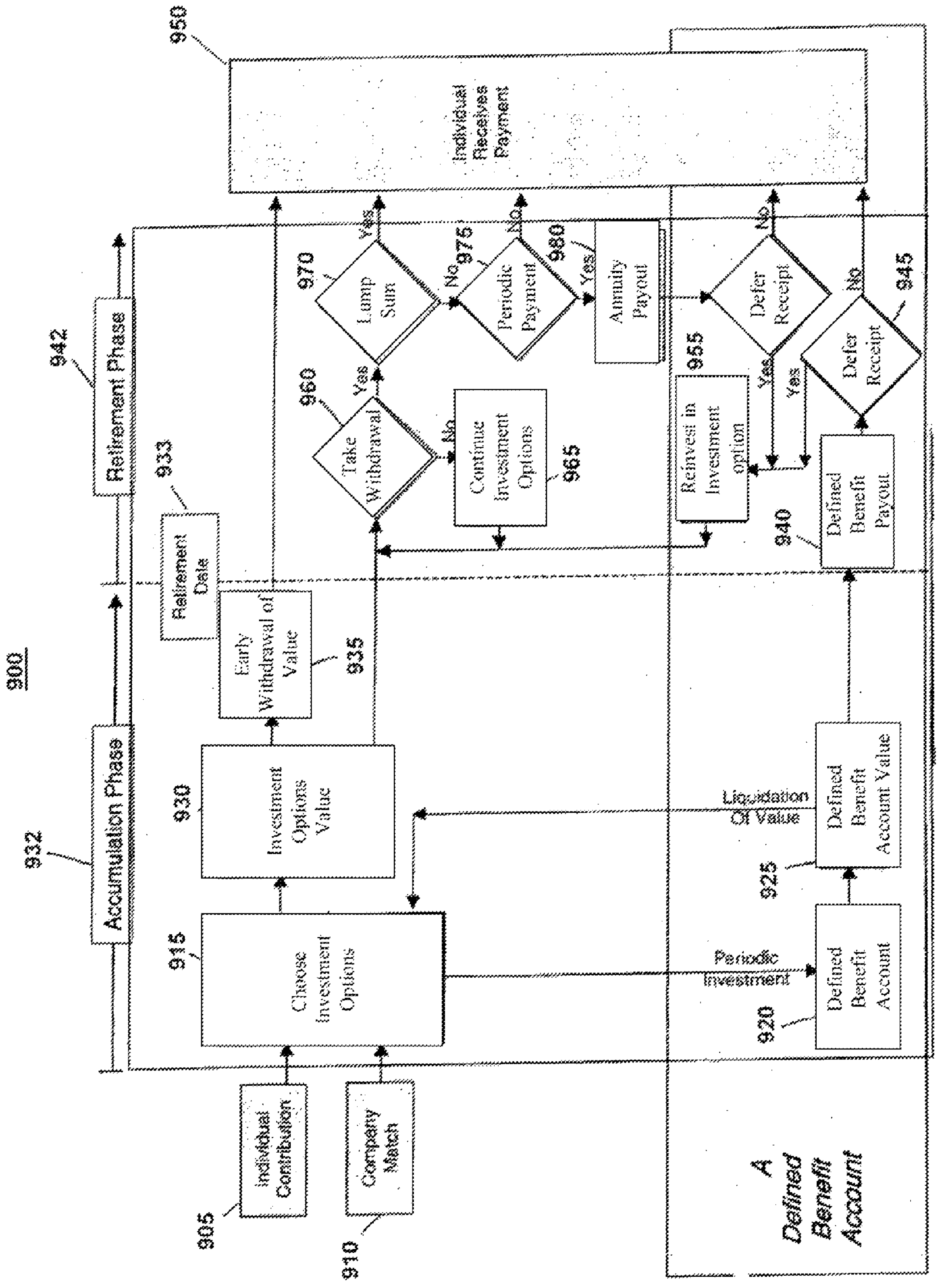
FIG. 9 illustrates one embodiment of a process for providing a participant with a plurality of retirement income payments using a defined benefit account.

FIG. 9 illustrates one embodiment of a method 900 for providing a participant with a plurality of retirement income payments. At steps 905 and 910, a participant and/or sponsor (e.g., employee and employer) may provide respective contributions (e.g. $25,000) into select investment vehicles. At step 915, the employer or employee (or both), for example, may select particular investment option(s) in which to invest the contributions. At step 920, the employee may opt to invest all or a portion of the contributions into a defined benefit account which may provide the user with a guaranteed retirement income. Upon selecting the defined benefit account, the employee may be asked several questions, such as: (1) age, (2) gender, (3) expected or desired retirement date, (4) type of payout plan desired for the guaranteed retirement income (e.g. lump sum, periodic payments, annuity payout, etc.), and (5) marital status, for example. In various embodiments, the employee's responses to these questions—along with other considerations such as when savings begin, specific product features and expenses, and current economic cycle, for example—may be used to develop a retirement income factor (or RIF). The RIF times the amount saved may comprise the guaranteed minimum retirement income payment(s) received by the employee at retirement. In some embodiments, the guaranteed retirement income may have other contingencies, such as the continued or periodic (e.g., monthly) investment of a predetermined amount, for example.

Next, at step 925, the $25,000 in contributions invested in the defined benefit account may increase in value throughout the accumulation phase 932. In some embodiments, the increase in value is achieved by investing the contributions in various investment products, such as a pension type balanced portfolio, for example. Other investment products may of course be used. In some embodiments, the employers may determine where contributions to the defined benefit account are invested. Throughout this investing time, referred to as the accumulation phase, the employee has the option of withdrawing (or liquidating) some or all of the accumulated value of the contribution and investing it in other investment product(s) or option(s) of his or her choosing, as shown in step 915, or to let it sit and continue accumulating in the defined benefit account for a predetermined period of time, such as until the retirement date 933, for example. In some embodiments, retirement date 933 does not refer an actual retirement date, but to a future date. If the employee chooses to reinvest in another product, he may be able to withdraw some or all of the invested value prior to retirement, as shown in step 935. In some embodiments, such early withdrawal may result in imposition of fees or penalties, or reduction in the guaranteed minimum retirement income payment amount. If the employee opts to keep the value in the defined benefit account, he may obtain payout of the accumulated amount at step 940, which occurs after retirement date 933, for example, in the period referred to as the retirement phase 942. At this point, the employee will have the option of deferring receipt, as shown in step 945. If deferral is not desired, the employee can collect payment at step 950. If, however, the employee opts to defer receipt of payment, accumulated value can be reinvested in other options, as shown in step 955. Deferring payment will allow the employee to take withdrawal at step 960 or to continue investing (step 965) throughout the retirement phase 942. If the employee opts to withdraw, he can do so as a lump sum (970), a periodic payment (975), or an annuity payout (980).

An employee using the investment structure shown in FIG. 9—e.g., a 401(k) plan having an embedded defined benefit account—would be guaranteed to receive a guaranteed retirement income for the portion of savings invested in the defined benefit account. Of course, the employee may realize more than the guaranteed retirement income amount if the portion of savings invested in the defined benefit account, and in other investment products (e.g., step 930), realizes a positive gain throughout the accumulation and retirement phases prior to receipt of payment at step 950.

Figure 10:
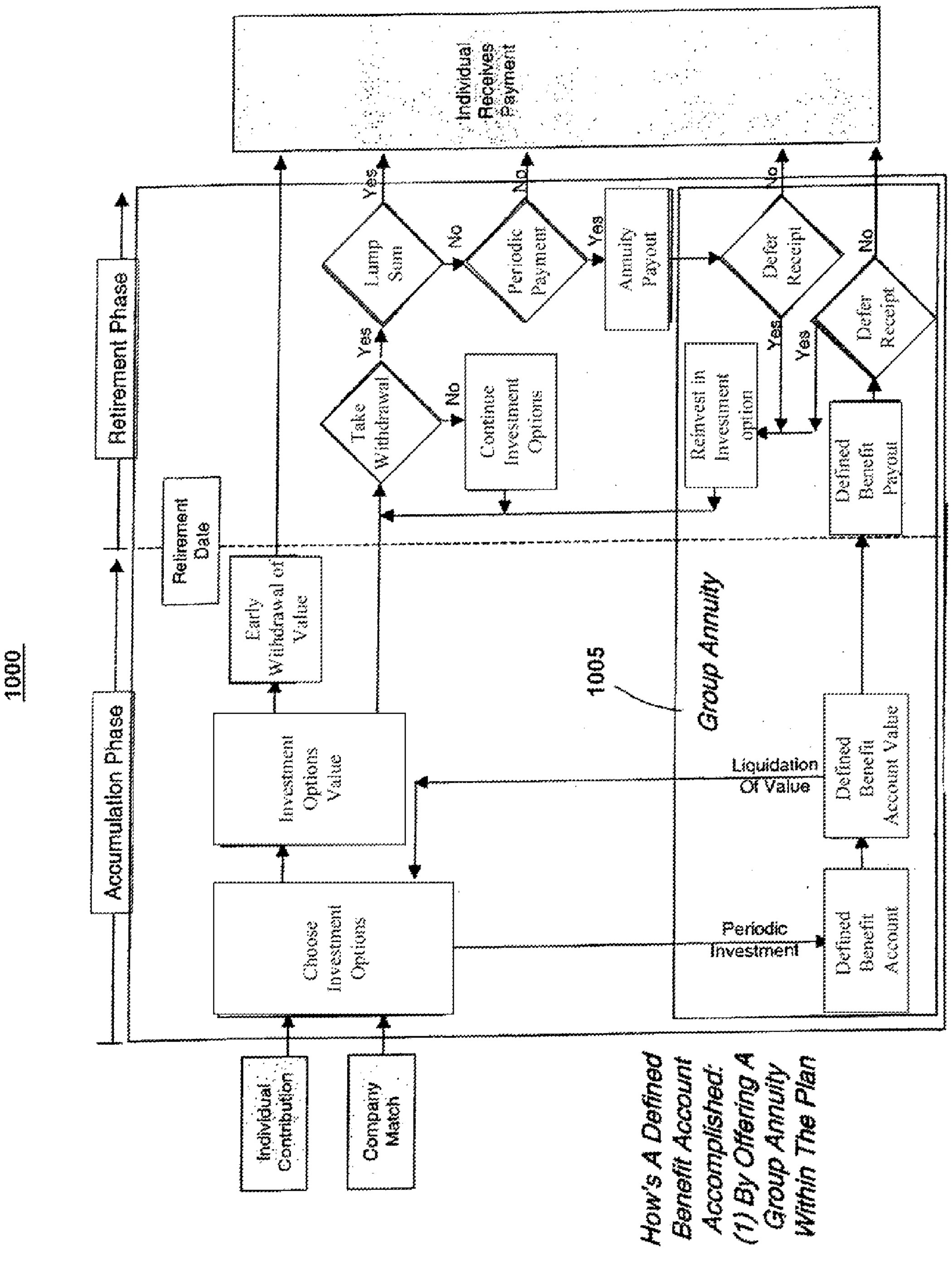
FIG. 10 illustrates one embodiment of a process wherein a defined benefit account is offered as a group annuity within a defined compensation plan.
Figure 11:
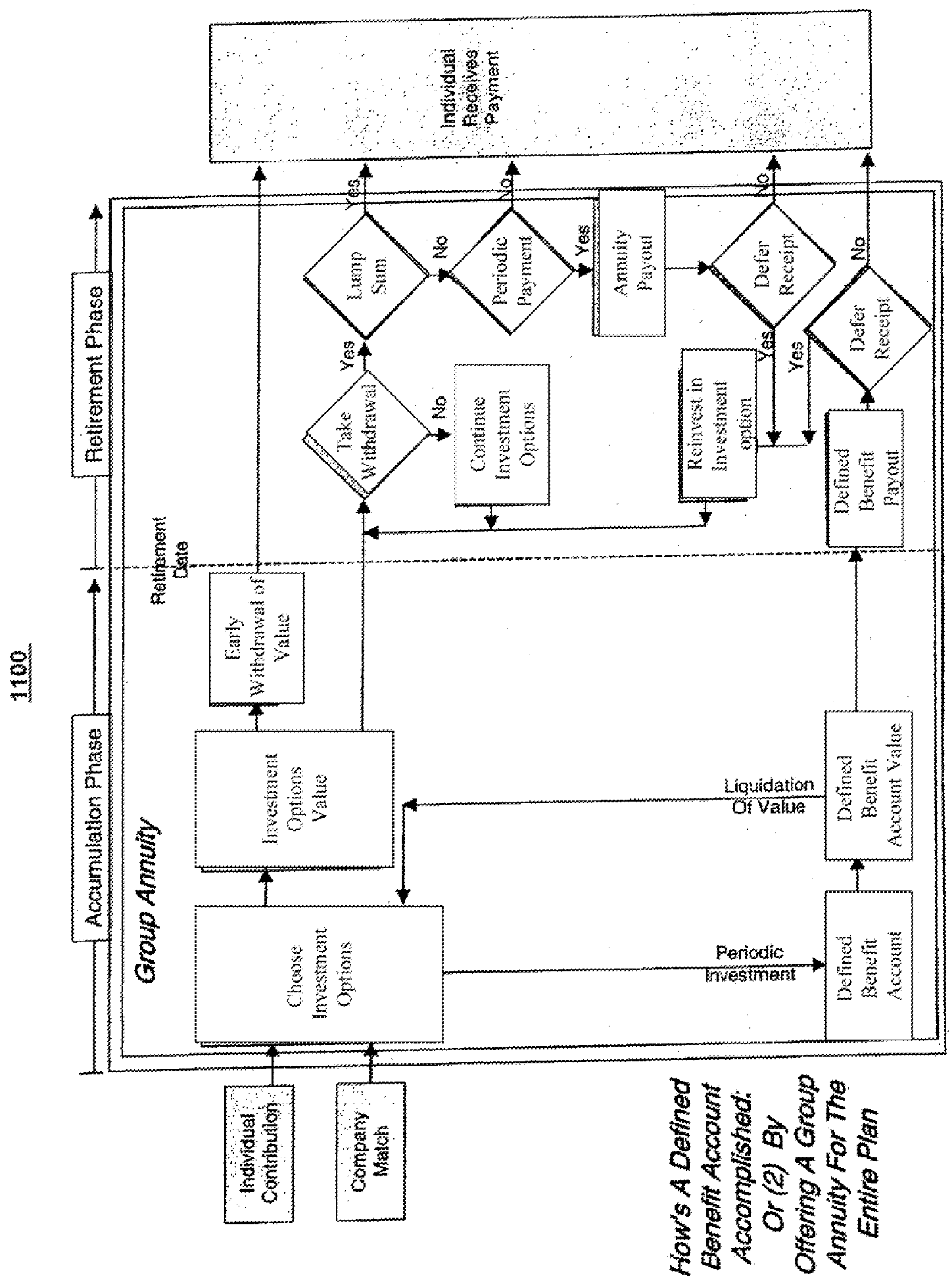
FIG. 11 illustrates one embodiment of a process wherein the defined benefit account is offered as a group annuity for the entire plan.

FIG. 10 illustrates one embodiment of the invention wherein the defined benefit account is offered as a group annuity 1005 within a defined contribution plan. FIG. 11 illustrates another embodiment of the invention wherein the defined benefit account is offered as a group annuity for the entire plan.

FIG. 12 illustrates one embodiment of a chart 1200 illustrating the accumulation of value throughout the accumulation phase and the retirement phase. During the accumulation phase 1205, an employee (and employer) may make contributions to various investment products which in the aggregate will accumulate with time. That is, the value saved into a defined benefit account and other investment options will generally increase/accumulate as retirement nears. While growth of value is shown linearly, it may be appreciated that growth will more likely fluctuate. In some embodiments, the invention may be used to accumulate value during the accumulation and retirement phases by providing an investment product, tool or structure (e.g., a defined benefit account), that enables a user to select the particular investment opportunities he would like to pursue, while simultaneously providing him or her the security of a guaranteed income payment at retirement. In some embodiments, the guaranteed income payment may be provided by a defined benefit account which may coordinate with other investment tools (e.g., a 401(k) plan or variable annuity) to accumulate value, such as shown in FIGS. 9, 10 and 11, for example.

FIG. 13 illustrates one embodiment of an interface 1300 that a participant, for example, might encounter when investing in the manner described above by accessing his or her account over a network, for example. In some other embodiments, interface 1300 may comprise a statement of a participant's investment account, for example. FIG. 13 also illustrates an embodiment of the invention in which a participant is investing in a defined benefit account. In some embodiments, investment may be through a 401(k) plan or a variable annuity product, as described above. In various other embodiments, the defined benefit account and/or variable annuity product, for example, may incorporate the adjustment account described above in an effort to guarantee the participant a minimum floor retirement payment, for example. Item 1 on interface 1300 may indicate the date or year (1999) in which a participant initially started saving for retirement. Item 2 indicates that the participant has saved (e.g., contributed) $25,000 since 1999.

Item 3 provides a retirement income factor (RIF) of 15.1234% that, in some embodiments, may be provided to a participant at the time he or she starts contributing to the defined benefit account, e.g. 1999. According to various embodiments, the RIF may be determined, calculated or based on various factors, including, for example, savings commencement date, payout plan selected, product features and expenses, economic cycle, participant's age, gender, retirement date, and marital status. Other factors are possible. In some embodiments, the RIF may be used to calculate the minimum retirement income payment the participant will receive throughout or at retirement, as shown in item 4. In various embodiments, the minimum retirement income payment may be conditioned on the participant continuing to make contributions throughout the accumulation phase. In various other embodiments, the RIF may increase or decrease, for example, if the participant contributes more or less than originally agreed in 1999.

FIG. 14 illustrates one embodiment of an interface 1400 illustrating an additional defined benefit account acquired in 2001. In some embodiments, an additional defined benefit account may be referred to as an additional layer. Item 1 indicates that the additional layer was added in 2001. Item 2 indicates that the participant has contributed $4,000 to this account since 2001. Item 3 shows the RIF that was quoted for this account in 2001. Item 4 shows the guaranteed minimum income payment if, for example, the agreed to contribution plan is maintained. Item 5 indicates the current account balance as a result of investment in select investments product(s), for example, such as a pension type balanced portfolio. Item 6 indicates the potential upside if the selected investment product(s) perform at 8% per year. Item 7 illustrates the total combined balances ($40,649.13), total transfers ($29,000), total minimum income payment ($4,364), and total upside potential ($5,533) of the two defined benefit accounts. In some embodiments, an additional layer may be triggered by calendar year, or any other period of time.

FIG. 15 illustrates one embodiment of an interface 1500 showing a projection of future benefit for the defined benefit accounts shown in FIG. 14. Item 1 indicates that projection of benefits is based on layers already established, i.e., the accounts established in 1999 and 2001. Item 2 shows the future projected annual transfers for each account. Item 3 indicates that the same RIF continues for each layer as previously established and quoted. Item 4 indicates a projection of the number of future years that transfers will be made before retirement. Item 5 indicates the projected guaranteed minimum income, which in some embodiments may comprise the annual savings amount for each layer times the RIF for the particular layer, times the number of contribution years remaining until retirement, for example. Item 6 shows that performance of the pension type balanced portfolio, or other investment product(s), for example, may be sufficient to add to the guaranteed minimum income. Item 7 illustrates that the total retirement income is the sum of both layers accrued and projected.

Figure 16:
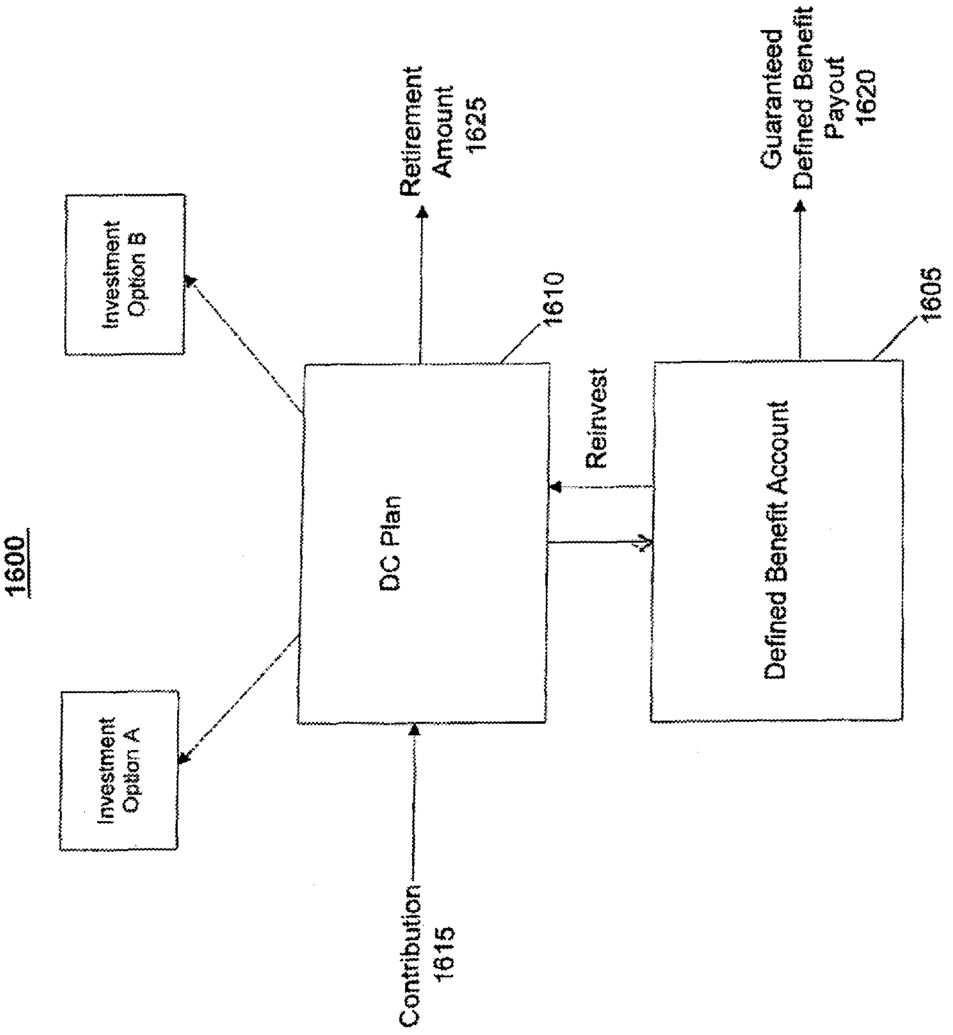
FIG. 16 illustrates one embodiment of a system using a defined benefit account.

FIG. 16 illustrates one embodiment of system 1600 including a defined benefit account 1605 according to the invention. As shown, the defined benefit account 1605 may be associated with a defined contribution (DC) plan 1610. In some embodiments, the DC plan may comprise a traditional 401(k) plan, or other like plan, which presents the defined benefit account as an investment option. DC plan 1610 may also include various other investment options, such as investment options A and B, for example. According to various embodiments, a participant in the DC plan 1610 can make contributions 1615, which may be matched by the participant's employer, for example. The participant may then select which investment options he or she wants to invest. For example, the participant may decide to invest in any of investment options A or B, or in defined benefit account 1605. In some embodiments, the contribution(s) are invested in a single option, while in other embodiments they are distributed among any number of investment options. If the participant invests some or all of the contribution(s) in defined benefit account 1605, a Retirement Income Factor can be quoted and a guaranteed defined benefit payout 1620 may be calculated as described above.

System 1600 also includes a retirement amount 1625, which in some embodiments may comprise the aggregate payout of options A and B and the defined benefit account 1605. If, for example, the participant invested other contribution(s) into options A and/or B, the retirement amount 1625 may be greater than the guaranteed defined benefit payout 1620, depending of course on the performances of investment options A, B and the defined benefit account 1605. Also, as previously described for FIG. 4, the actual payout amount from the defined benefit account 1605 can exceed the guaranteed defined benefit payout when the defined benefit account investment performance exceeds previously defined expectations. If, however, the participant invested exclusively in defined benefit account 1605, then the retirement amount 1625 is at least the guaranteed defined benefit payout 1620, and may be greater if performance is greater than expected.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A system for providing a user with a defined benefit within a qualified or non-qualified defined contribution plan, based on a factor that indicates the exact guaranteed minimum periodic income that the user will receive regardless of how long the user lives and the potential for an increase in the periodic income based on excess investment performance over the formula of the designated defined benefit investment options, comprising:

a defined contribution module that periodically receives at least one of a sponsor contribution and a participant contribution and for accumulating value over a period of time by investing at least one of the sponsor contribution and the participant contribution or any portion(s) thereof in any number of select investment option(s), the accumulated value, or any portion(s) thereof, being capable of at least one selected from the group consisting of:

being withdrawn at any time, and being paid out after a predetermined period of time, the defined contribution module constituted by a programmed computer processor which communicates with the user via a network; and wherein the selected investment options comprise any number of investment products and at least one designated defined benefit investment option module for:

receiving at least one investment payment from the defined contribution module, the investment payment comprising at least one of the sponsor contribution, the participant contribution, and/or the accumulated value, or any portion(s) thereof, paying out a guaranteed minimum income payment after the accumulation period of time, the guaranteed minimum income payment being based on a retirement income factor, and increasing the income payment for life for excess performance over the factor of the designated defined benefit investment option.

2. The system of claim 1 wherein the retirement income factor is based on at least one of a savings commencement date, payout plan selected, product features and expenses, economic cycle, participant's age, gender, retirement date, and marital status.

3. The system of claim 1 wherein the defined contribution plan comprises a qualified or non-qualified plan and a variable annuity investment product.

4. The system of claim 1 wherein the select investment options further comprises at least one mutual fund.

5. The system of claim 1 wherein the select investment options further comprises at least one other financial product.

6. The system of claim 1 wherein paying out accumulated value after a period of time comprises at least one of a lump sum payment, periodic payments and annuity payouts.

7. The system of claim 1 wherein the payment of the guaranteed minimum income payment after a predetermined period of time is further conditioned on a predetermined pattern of continued contributions by at least one of the sponsor and the participant.

8. The system of claim 1 wherein the investment payment to the designated defined benefit investment option is determined by either the participant, the sponsor, or both.

9. The system of claim 1 wherein the guaranteed minimum income payment to the designated defined benefit investment option comprises the product of the at least one investment payment, or any portion(s) thereof, and the retirement income factor.

10. The system of claim 1 wherein the guaranteed minimum income payment comprises a formula of the accumulated value, or any portion(s) thereof, and the associated retirement income factor(s).

11. The system of claim 1 wherein the reinvestment of the guaranteed minimum income payment is determined by the participant.

12. A system for providing a user with a defined benefit within a qualified or non-qualified defined contribution plan, based on a factor that indicates the exact guaranteed minimum periodic income that the user will receive regardless of how long the user lives and the potential for an increase in the periodic income based on excess investment performance over the formula of the designated defined benefit investment options, comprising:

a defined contribution module that periodically receives a sponsor contribution and a participant contribution and for accumulating value over a period of time by investing the sponsor contribution and the participant contribution in any number of select investment options, the accumulated value, or any portion(s) thereof, being capable of at least one selected from the group consisting of:

being withdrawn at any time, and being paid out after a predetermined period of time, the defined contribution module constituted by a programmed computer processor which communicates with the user via a network; and wherein the selected investment options comprise any number of investment products and at least one designated defined benefit investment option module for:

receiving at least one investment payment from the defined contribution module, the investment payment comprising at least one of the sponsor contribution, the participant contribution, and/or the accumulated value, or any portion(s) thereof, for paying out a guaranteed minimum income payment after the accumulation period of time, the guaranteed minimum income payment being based on a retirement income factor, and increasing the income payment for life for excess performance over the factor of the designated defined benefit investment option.

* * * * *